United States Patent [19]
Acke

[11] Patent Number: 6,057,510
[45] Date of Patent: *May 2, 2000

[54] INSULATION DISPLACEMENT CONNECTION DEVICE AND INSULATOR ELEMENT FOR BRACING AND CENTERING AN INNER CONDUCTOR IN AN OUTER CONDUCTOR

[75] Inventor: Edgard Acke, Oostkamp, Belgium

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/535,713

[22] Filed: Sep. 28, 1995

[30] Foreign Application Priority Data

| Sep. 28, 1994 | [DE] | Germany | 44 34 702 |
| Jun. 14, 1995 | [DE] | Germany | 195 21 714 |
| Jun. 14, 1995 | [DE] | Germany | 295 09 732 U |
| Jun. 14, 1995 | [DE] | Germany | 295 09 719 U |

[51] Int. Cl.$^7$ .................................................. H01R 4/00
[52] U.S. Cl. .................... 174/84 R; 174/88 R; 174/88 C
[58] Field of Search ............................ 174/84 C, 84 R, 174/75 C, 75 F

[56] References Cited

U.S. PATENT DOCUMENTS

| 2,970,184 | 1/1961 | Blonder | 174/88 C |
| 3,750,090 | 7/1973 | Teman | 339/130 C |
| 4,416,501 | 11/1983 | Fusselman et al. | 174/75 C |
| 4,472,596 | 9/1984 | Brown et al. | 174/84 C |
| 4,492,815 | 1/1985 | Maros | 174/84 C |
| 4,533,191 | 8/1985 | Blackwood | 439/174 |
| 4,533,193 | 8/1985 | Blackwood | 439/374 |
| 4,533,199 | 8/1985 | Blackwood | 439/404 |
| 4,927,378 | 5/1990 | Song | 439/394 |
| 4,973,258 | 11/1990 | Fusselman | 439/98 |
| 5,037,329 | 8/1991 | Wright | 439/582 |
| 5,148,086 | 9/1992 | Costa | 174/162 |
| 5,380,951 | 1/1995 | Comerci et al. | 174/48 |
| 5,393,932 | 2/1995 | Young et al. | 174/84 C |

FOREIGN PATENT DOCUMENTS

| 0 145 407 A2 | 6/1985 | European Pat. Off. . |
| 0 419 038 A1 | 3/1991 | European Pat. Off. . |
| 0228750 | 4/1993 | European Pat. Off. . |
| 9319498 | 9/1993 | WIPO . |

*Primary Examiner*—Kristine Kincaid
*Assistant Examiner*—William H. Mayo, III
*Attorney, Agent, or Firm*—Herbert L. Lerner; Laurence A. Greenberg; Werner H. Stemer

[57] ABSTRACT

An insulation displacement connection device for coaxial cables includes a conductive housing having a cable connection stub and a device for insulation displacement connection of outer and inner cable conductors. The stub has at least one recess formed therein extending crosswise to a center axis and being open toward the outside, for introducing the device. The device cuts through an outer insulating cable sheath and contacts the outer cable conductor upon being plugged into the recess. The device is self-clampingly retained in the recess in a plugged-in state. An insulation displacement connection device for electrically joining a first electrical conductor to a second electrical conductor includes a slit being formed in the first conductor and being constructed and dimensioned with a width being at least partially less than the diameter of the second conductor. A recess is formed in the first conductor and is constructed and dimensioned for permitting the second conductor to be introduced into the recess substantially without resistance. The slit begins at the recess. An insulator element for bracing and centering an inner conductor in an outer conductor includes hollow spaces inside the insulator element and/or between the insulator element and the inner conductor and/or between the insulator element and the outer conductor.

30 Claims, 16 Drawing Sheets

INSULATION DISPLACEMENT CONNECTION DEVICE AND INSULATOR ELEMENT FOR BRACING AND CENTERING AN INNER CONDUCTOR IN AN OUTER CONDUCTOR

BACKGROUND OF THE INVENTION

FIELD OF THE INVENTION

The present invention relates an insulation displacement connection device for coaxial cables, having a conductively constructed housing with cable connection stubs and a device for the insulation displacement connection (IDC) of the outer cable conductor and the inner cable conductor. The invention also relates to an insulation displacement connection device for electrically joining a first electrical conductor to a second electrical conductor, wherein the first electrical conductor has a slit which is constructed and dimensioned in such a way that its width is at least partially less than the diameter of the second conductor. The invention additionally relates to an insulator element for bracing and centering an inner conductor in an outer conductor, wherein hollow spaces are provided inside the insulator element and/or between the insulator element and the inner conductor and/or between the insulator element and the outer conductor, having an inner conductor receiving portion for receiving the inner conductor and having at least one bracing zone for bracing the insulator element in the outer conductor.

The insulation displacement connection (IDC) technique for contacting insulated electrical conductors without baring the insulation and without solder is well known and is used, among other purposes, in joining coaxial cables for connection and contacting of the inner and outer cable conductors. Insulation displacement connections of that kind for coaxial cables are known, for instance, from European Patent Application 0 228 750 B1, or U.S. Pat. Nos. 4,533,191; 4,533,193; and 4,533,199.

International Patent Application WO 93/19498 also discloses a contact housing for connecting a coaxial cable, in which the contacting of the outer cable conductor and the inner cable conductor is again done without solder by the insulation displacement connection (IDC) technique. In it, a plug screw likewise being formed of electrically conductive material is firmly joined to the contact housing. In order to contact the outer cable conductor, knife contacts of various sizes which are adapted to the cable diameter are provided. They are pressed into the cable through the use of a pliers and clamped to the cable shield and are then firmly enclosed and blocked by a cup-shaped sealing sleeve secured to the cable connection stub of the contact housing. In that known configuration, the knife contacts of one size can be exchanged for knife contacts of another size given the same layout of the configuration, and therefore it is possible to connect coaxial cables of different diameters.

The insulation displacement connection devices described in those references are unable, for various reasons, to assure simple and reliable manufacture of secure, durable connections or contacting and are therefore in need of improvement in various aspects.

SUMMARY OF THE INVENTION

It is accordingly an object of the invention to provide an insulation displacement connection device and an insulator element for bracing and centering an inner conductor in an outer conductor, which overcome the hereinafore-mentioned disadvantages of the heretofore-known devices of this general type.

If the point of departure is taken as an insulation displacement connection device for coaxial cables, having a conductively constructed housing with cable connection stubs and a device for the insulation displacement connection (IDC) of the outer cable conductor and the inner cable conductor, it is the object of the present invention to further construct an insulation displacement connection device of that kind in such a way that the simplest possible connection above all of the outer cable conductor is assured and should be able to be provided quickly and reliably without special tools, even by less highly qualified mechanics or by non-specialists in the field.

If the point of departure is taken as an insulation displacement connection device for electrically joining a first electrical conductor to a second electrical conductor, wherein the first electrical conductor has a slit which is constructed and dimensioned in such a way that its width is at least partially less than the diameter of the second conductor, it is also the object of the present invention to further construct an insulation displacement connection device of that kind in such a way that the simplest possible, secure and reliable production of the mechanical and electrical connection is assured.

Nevertheless, however, the apparatus for guiding the conductors that are to be joined to the insulation displacement connection device is a possible weak point, which can very considerably impair the quality of the connections made by the IDC process.

An apparatus for carrying the conductors to be joined to the insulation displacement connection device, in the form of an insulator element of the type referred to at the outset, is known from German Utility Model 86 06 983 U.

That known insulator element has a hollow-cylindrical inner conductor receiving portion and bracing zones, extending radially from it and extending continuously in the axial direction, in the form of narrow webs.

Hollow spaces or chambers are formed between the webs and between the inner conductor receiving portion of the insulator element and the outer conductor.

The provision of hollow spaces inside the insulator element and/or between the insulator element and the inner conductor and/or between the insulator element and the outer conductor has proved to be advantageous, because on one hand it causes fewer dielectric losses through the insulator element, and on the other hand a smaller amount of insulating material is needed.

However, such insulator elements, in contrast to solid insulator elements, have the disadvantage that the electrical properties of the electric line including the inner and outer conductors are location-dependent and can only be adjusted exactly to desired values with difficulty.

Other embodiments of insulator elements are known from German Patent DE-PS 647 150, German Published, Prosecuted Patent Application DE-AS 12 04 294, and German Patent DE-PS 16 40 711.

Due to their readily deformable and therefore not very stable structure, the insulator elements known from the above references are not capable of serving to provide reliable bracing and centering of the inner conductor in the outer conductor. For that and other reasons, they thus also have the disadvantage that the electrical properties of the electric line including the inner and outer conductors have a certain location dependency and are thus only adjustable exactly to desired values with difficulty.

If the point of departure taken by the invention is an insulator element for bracing and centering an inner conductor in an outer conductor, wherein hollow spaces or chambers are provided inside the insulator element and/or between the insulator element and the inner conductor and/or between the insulator element and the outer conductor, having an inner conductor receiving portion for receiving the inner conductor and having at least one bracing zone for bracing the insulator element in the outer conductor, the object of the invention is an insulator element that when used to brace and center an inner conductor in an outer conductor, makes electrical properties of an electric line including the inner and outer conductors adjustable simply, accurately and reliably to desired values.

With the foregoing and other objects in view there is provided, in accordance with the invention, an insulation displacement connection device for coaxial cables, comprising a conductive housing having a cable connection stub; and a device for insulation displacement connection of an outer cable conductor having an outer insulating cable sheath and an inner cable conductor of a coaxial cable; the cable connection stub having a center axis and having at least one recess formed therein extending crosswise to the center axis and being open toward the outside, for introducing the device for insulation displacement connection of the outer cable conductor, the device cutting through the outer insulating cable sheath and contacting the outer cable conductor upon being plugged into the at least one recess, and the device being self-clampingly retained in the at least one recess in a plugged-in state in the at least one recess.

In such an insulation displacement connection device, the cable end to be connected is received in the cable connection stub of the housing. To that end, the cable connection stub has an adequate length, and its inside diameter is preferably approximately equivalent to the outer diameter of the cable measured to include the outer insulating cable sheath thereof. The cable is not bared of insulation in the outer conductor connection region or in other words it is not freed of the outer cable jacket. It is only in the inner conductor connection region that at least the outer cable sheath and the outer cable conductor, but not necessarily the inner insulation as well, is removed between the outer cable conductor and the inner cable conductor. The cable connection stub that receives the cable end simultaneously serves the purpose of introducing the insulation displacement connection device for the outer cable conductor. To that end, the cable connection stub is provided crosswise to its center axis with at least one recess being open toward the outside, or a plurality of such recesses, so that the insulation displacement connection device for the outer cable conductor is insertable from the outside into the cable connection stub and in the process cuts through the outer insulating cable sheath and contacts the outer cable conductor. This connection operation is very simple, fast and uncritical to accomplish, and therefore it requires no special tools and instead can be done by anyone, without particular qualifications and with generally familiar tools. This type of insulation displacement connection for the outer conductor of a coaxial cable moreover makes an especially simple construction of the device possible, because all that is required for this is the cable connection stub, which is present in any case in a connection device for coaxial cables, and a simple connection device that is insertable from outside into this cable connection stub. In order to avoid special provisions and parts for fixing the inserted connection device and so as not to complicate the construction of the connection device for the sake of fixing the connection device, the connection device for the outer cable conductor, which connection device is inserted into the recesses of the cable connection stub, is held self-clampingly in the recesses.

In the insulation displacement connection device according to the invention, the device for the insulation displacement connection of the outer cable conductor advantageously includes at least one approximately U-shaped clamp, having inner edges which are constructed as cutting zones. Such a connection device is easy to produce and can be mounted in a simple way in the connection operation. Moreover, U-shaped and therefore intrinsically resilient IDC clamps, because of the two side legs being joined through a middle web, have a shape such that when a clamp is pressed onto a cable or when the insulating outer cable sheath is cut into down to the outer cable conductor, the two side legs of the clamp durably exert an elastic clamping tension, in contrast to rigid contact elements. Due to the U-shape of the clamp, a plurality of contact points on the cable periphery arise by way of the two side legs in the middle web. The overall result is that a gas-tight, low-impedance connection between the outer cable conductor and an IDC clamp is assured. In order to even further reinforce the effect of the elastic clamping tension, it is suitable if the side legs of a clamp are spaced apart on their free end by a somewhat smaller distance than in the region of their base that begins at the middle web, so that the clamps are pressed onto the cable with a certain initial stress.

With a view toward the fixation of the clamps, it is expedient if the middle web of the clamp adjoins the side legs together has a knurled portion on at least one lateral outer surface, and for self-clamping retention of the clamp is press-fitted into the recess of the cable connection stub. The clamps being inserted from outside into the cable connection stub are then readily, in other words without additional elements and without further provisions, held securely and firmly in the cable connection stub.

The insulation displacement connection device according to the invention is usable both for coaxial cables of a certain diameter and for coaxial cables of different diameters. When coaxial cables of a certain diameter are connected, the inside diameter of the cable connection stub is approximately equal to the outer diameter of the coaxial cable including the outer insulating cable sheath thereof. When coaxial cables of different diameters are connected, a cable-adapted adapter sleeve of insulating material is inserted, in such a manner as to be secured against relative rotation, into the cable connection stub, and is provided on its wall with recesses, extending transversely to its center axis and being open toward the outside, which in the state in which they are inserted in a manner being fixed against relative rotation, are accessible through the recesses of the cable connection stub for the introduction of cable-adapted clamps. In that case, the inside diameter of the cable connection stub is approximately equal to the outer diameter of the plugged-in adapter sleeve, and the inside diameter of the adapter sleeve is approximately equal to the outer diameter of the coaxial cable including its outer insulating cable sheath.

In an insulation displacement connection device according to the invention, the recesses of the cable connection stub, and in the case where an additional adapter sleeve insertable into the cable connection stub is used its recesses, are preferably in the form of slits, which are provided in a number and disposition that matches the number and disposition of the clamps in the cable connection stub. In order to provide a connection of an outer cable conductor, for instance, four IDC clamps can be used that are positioned in pairs, approximately facing one another, on the cable connection stub. More or fewer IDC clamps can be provided as needed.

In the version described thus far, for the reasons given, the device for insulation displacement connection of the outer cable conductor preferably includes U-shaped IDC clamps, but they can also take some other form. It is, for instance, possible for the device for the insulation displacement connection of the outer cable conductor to be formed by at least two clamping plugs, which are knurled on the outer periphery and are constructed to be conductive, and which are pressed self-clampingly from opposite sides radially into bores in the wall of the cable connection stub and are constructed with cutting zones on the side which faces toward the coaxial cable being introduced into the cable connection stub.

Alternatively or in addition, it may also be provided that the device for the IDC is constructed with at least one clamping plug, which is constructed in such a way that it has a recess for partially receiving the coaxial cable on the side which upon insertion into the recess is to be turned toward the coaxial cable being introduced into the cable connection stub.

Constructing the clamping plug with a recess in which the cable to be connected can be partially received makes it possible for the clamping plug to come into electrical contact with the cable to be connected not merely at one or a few selected points but rather virtually arbitrarily over a large surface area, and thus the resultant electrical connection is extremely low in impedance and is durable.

The above-described embodiment has created an insulation displacement connection device through which extremely simple connection of the outer cable conductor, above all, is assured, and can be carried out quickly and reliably without special tools even by less-qualified mechanics or non-specialists.

With the objects of the invention in view, there is also provided an insulation displacement connection device for electrically joining a first electrical conductor to a second electrical conductor, comprising a slit being formed in a first electrical conductor and being constructed and dimensioned with a width being at least partially less than the diameter of a second electrical conductor; a recess being formed in the first electrical conductor and being constructed and dimensioned for permitting the second electrical conductor to be introduced into the recess substantially without resistance; and the slit beginning at the recess.

Through the use of the provision of the recess that communicates with the slit according to the invention, it is possible to more or less roughly preposition the second conductor relative to the slit of the first conductor initially. The second conductor can then no longer leave this position, without a purposeful intervention from outside. It can either not leave this position at all or at best can do so only under the most unfavorable conditions.

The second conductor can then be pressed reliably and securely in the intended way from this defined preliminary position into the slit of the first conductor.

Although as a rule the recess for prepositioning will be relatively large, so as to enable simple, resistance-free introduction of the second conductor into it, and so as to ensure that the second conductor within this recess will also enjoy a certain freedom of motion, nevertheless this freedom of motion is not remotely as great as would be the case if the recess were not provided.

The likelihood that inexact positioning and/or slippage of the second conductor in the meantime when the connection is made will cause damage to the conductors and/or defective electrical connections is thus reduced virtually to zero.

Through the use of the embodiment described above, an insulation displacement connection device has been created that enables simple, secure and reliable manufacture of an insulation displacement connection of two electrical conductors.

With the objects of the invention in view, there is additionally provided an insulator element for bracing and centering an inner conductor in an outer conductor, comprising hollow spaces inside the insulator element and/or between the insulator element and the inner conductor and/or between the insulator element and the outer conductor; an inner conductor receiving portion for receiving the inner conductor; the inner conductor receiving portion having at least one bracing zone for bracing the insulator element in the outer conductor; and the at least one bracing zone having at least one surface portion extending inclined relative to a surface normal of the inner conductor.

Through the use of the provision of such inclined support zones, it becomes possible to prevent an abrupt change in the insulator element geometry and in the average quantity of insulating material per unit of volume between the inner and outer conductors, and as a result the electrical field that develops in operation between the inner conductor and the outer conductor is free of anomalies and thus has a locally completely homogeneous course.

This circumstance makes possible a relatively simple, reliable and constantly accurate adjustment of electrical properties such as the wave resistance of an electric line including the inner and outer conductors, over the entire length of the electric line.

This in turn has a favorable effect on the quality of the signals transmitted through the inner and outer conductors.

Aside from this, bodies with surfaces inclined in accordance with the invention are easier to make than bodies that have the aforementioned abrupt change in the geometry of extensions or protuberances.

Through the use of the embodiment described above, an apparatus is created for carrying the conductors to be joined to the insulation displacement connection device in the form of an insulator element, and this makes it possible to adjust the electrical properties simply, accurately and reliably to desired values, when the insulator element is used to brace and center an inner conductor in an outer conductor.

The insulation displacement connection device according to the invention and the apparatus according to the invention for guiding conductors to it that are to be joined, are suitable for coaxial plug-type connections, such as right-angle plugs and cable couplers, in particular but not exclusively for connecting coaxial cables of smaller-sized families, for instance on the order of magnitude of 1.0/2.3 or 1.6/5.6.

Other features which are considered as characteristic for the invention are set forth in the appended claims.

Although the invention is illustrated and described herein as embodied in an insulation displacement connection device and an insulator element for bracing and centering an inner conductor in an outer conductor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 7A:
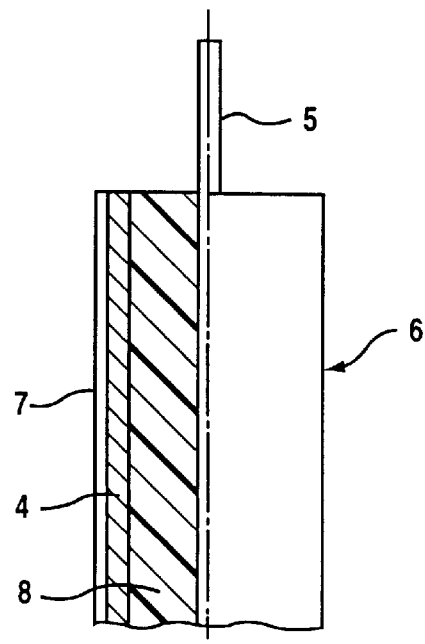
FIG. 7 is a partly sectional view of two partially bared ends of coaxial cables that are to be connected.
Figure 7B:
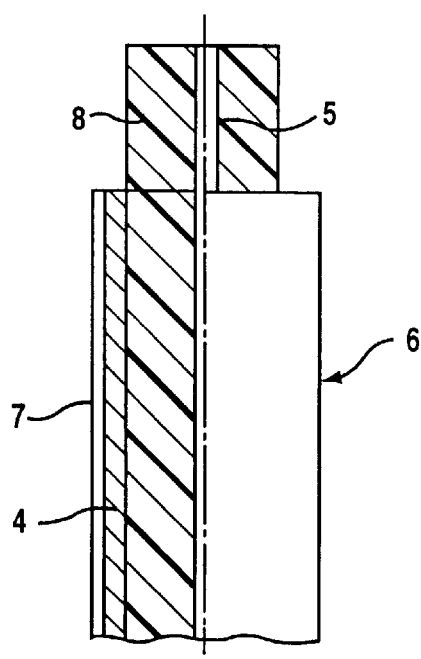

Referring now in detail to the figures of the drawing, which show exemplary embodiments and uses in a right-angle plug connector and in a straight plug connector, and first, particularly, to FIGS. 1–4 thereof, there is seen a coaxial right-angled plug connector which includes a conductively constructed housing 1, for instance a metal housing, that is constructed with a cable connection stub 3 being bent at an angle from a straight housing part 2 and with a device for insulation displacement connection (IDC) of an outer conductor 4 and an inner conductor 5 of a coaxial cable 6. By way of example, the outer conductor 4 can include a shielding mesh, it is surrounded by an outer insulating cable sheath 7, and is it insulated from the inner conductor 5 by an inner insulation 8. In order to provide a connection of the coaxial cable 6, its end is prepared in the manner shown in FIG. 7. In other words, a portion of the inner conductor 5 on the cable end is entirely bared of insulation, or else the cable sheath 7 and the outer conductor 4 are merely removed in the region of the inner conductor connection. The coaxial cable 6, after being prepared in this way, is introduced into the cable connection stub 3 in order to connect the inner cable conductor and the outer cable conductor.

To that end, in the embodiment of FIGS. 1–4, the inner diameter of the cable connection stub 3 is equal to the outer diameter of the coaxial cable 6 through its outer insulating cable sheath 7, so that the cable end is received fittingly in the cable connection stub, resting against an inner wall thereof. In order to provide a connection of the outer cable conductor 4, or in other words in order to contact it and electrically connect it to the housing 1 without using solder, a plurality of U-shaped clamps 9 of metal are provided, which have resilient side legs 10 formed by the U shape and a middle web 11 that joins the legs. The clamps may be defined as a device or means for insulation displacement connection (IDC) of the outer cable conductor 4. The inner surfaces of the side legs and of the middle web are constructed as sharp-edged cutting zones 12, which are capable of cutting through the cable sheath 7 and cutting into the outer cable conductor 4. Free ends of the side legs 10 of the clamps 9 are also constructed as punch points.

In the embodiment shown in FIGS. 1–4, a total of four clamps 9 are used for connecting the outer cable conductor 4. The clamps 9 are positioned in pairs, facing one another, on the cable connection stub 3. As can be seen from a clamp shown in dashed lines in FIG. 2, it is also possible for the clamps to be disposed offset from one another in the direction of the center axis of the cable connection stub 3. The clamps 9 are introduced from the outside laterally into the cable connection stub. To that end, the cable connection stub is provided with a number of recesses that matches the number of clamps 9. The recesses are formed by slits 13 in the wall of the cable connection stub that are open to the outside and extend transversely to its center axis. Transverse bores 14 are disposed in the wall of the cable connection stub 3 in the region of the slits 13 as further recesses for introducing the side legs 10 of a clamp 9. Two transverse bores per clamp are provided for the two side legs of the clamps.

Figure 3:
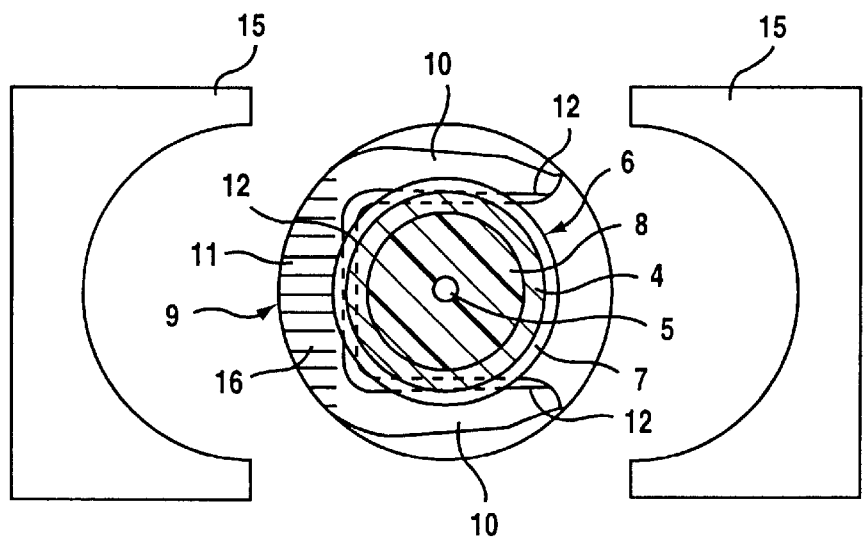
FIG. 3 is a sectional view taken along a line III—III of FIG. 2, in the direction of the arrows.

The spacing between the two transverse bores 14 depends on the spacing of the side legs 10 from one another and, as FIG. 3 suggests, the inner spacing between the side legs of the clamps is less than the outside diameter of the outer cable conductor 4 and is greater than the outside diameter of the inner insulation 8 between the outer cable conductor 4 and the inner cable conductor 5. As a result, the clamps are constructed in such a way that upon introduction into the recesses 13, 14 they cut through the outer insulating cable sheath 7, contact the outer cable conductor 4 and connect it electrically conductively to the housing. In order to provide for introduction of the clamps, or at least to provide for pressing the clamps into the recesses 13, 14, and for slipping them onto the coaxial cable 6, simple, well known tools may be used, such as jaws 15 of clamping pliers seen in FIG. 3. It is expedient if the outer end surface of the middle web 11 of the clamps and the inner surfaces of the jaws 15 are adapted to one another in their shape.

Figure 2:
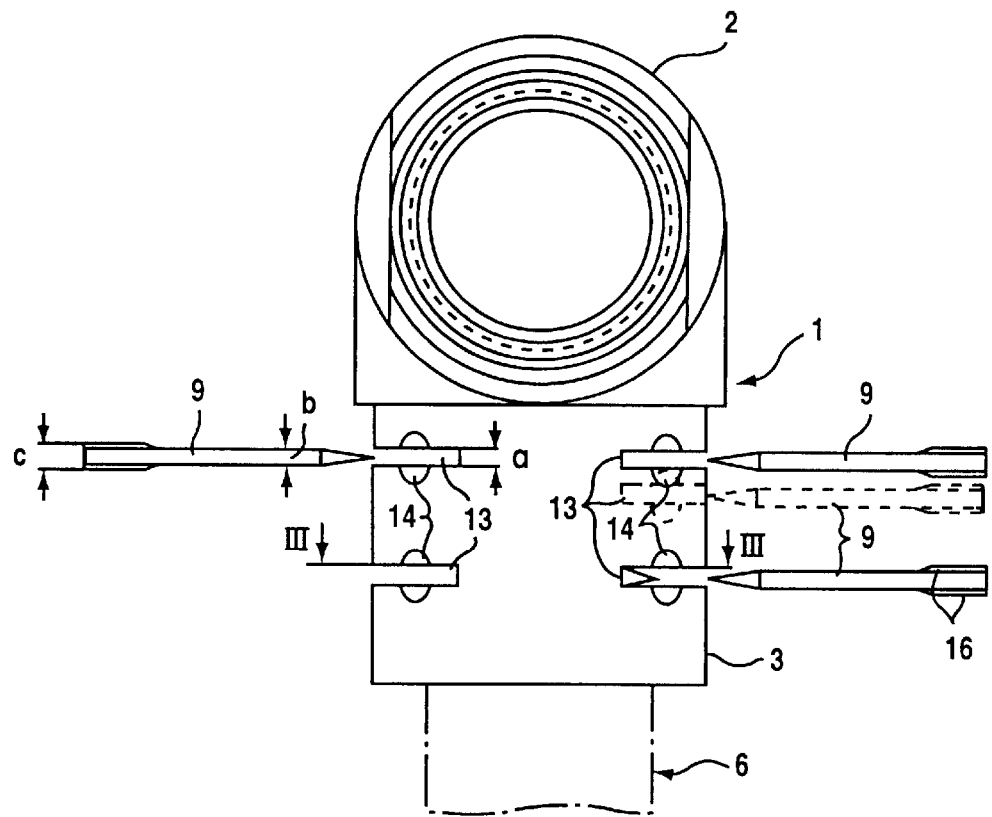
FIG. 2 is a fragmentary, end-elevational view taken along a line II—II of FIG. 1, in the direction of the arrows.

In order to fix the clamps without further expenditure, it is expedient if the clamps, in the state of having been inserted into the recesses 13, 14, are retained in self-clamping fashion. To that end, the middle webs 11 of the clamps 9 have a knurled portion 16, extending in the insertion direction of the clamps, on at least one lateral outer surface. In the embodiments shown, such portions are provided on two opposed lateral outer surfaces, so that the clamps can be press-fitted into the slits 13 of the cable connection stub 3. In order to attain a secure self-clamping retention, as is seen in FIG. 2, it is expedient if a thickness c of a clamp 9 in the region of the middle web 11 that is knurled on both sides is greater than a width a of the slit 13, and the width a is greater than a thickness b of the side legs 10 of the clamps, so that $c > a > b$. The fit with tension of the cutting zone 12 in the region of the thickness c of the middle web 11 in the slits 13 of the dimension a is chosen in such a way that a low-impedance connection with the housing 1 is assured. The clamps 9, in other words, are double contacts, which accomplish the contacting of the outer cable conductor 4 and its electrical connection to the housing.

After the clamps 9 have been inserted into the recesses 13, 14, the side legs 10 still protrude freely and elastically opposite the wall of the cable connection stub 3, so that the side legs 10 of the clamps elastically contact the outer cable conductor 4 with tension and keep it clamped.

Figure 1:
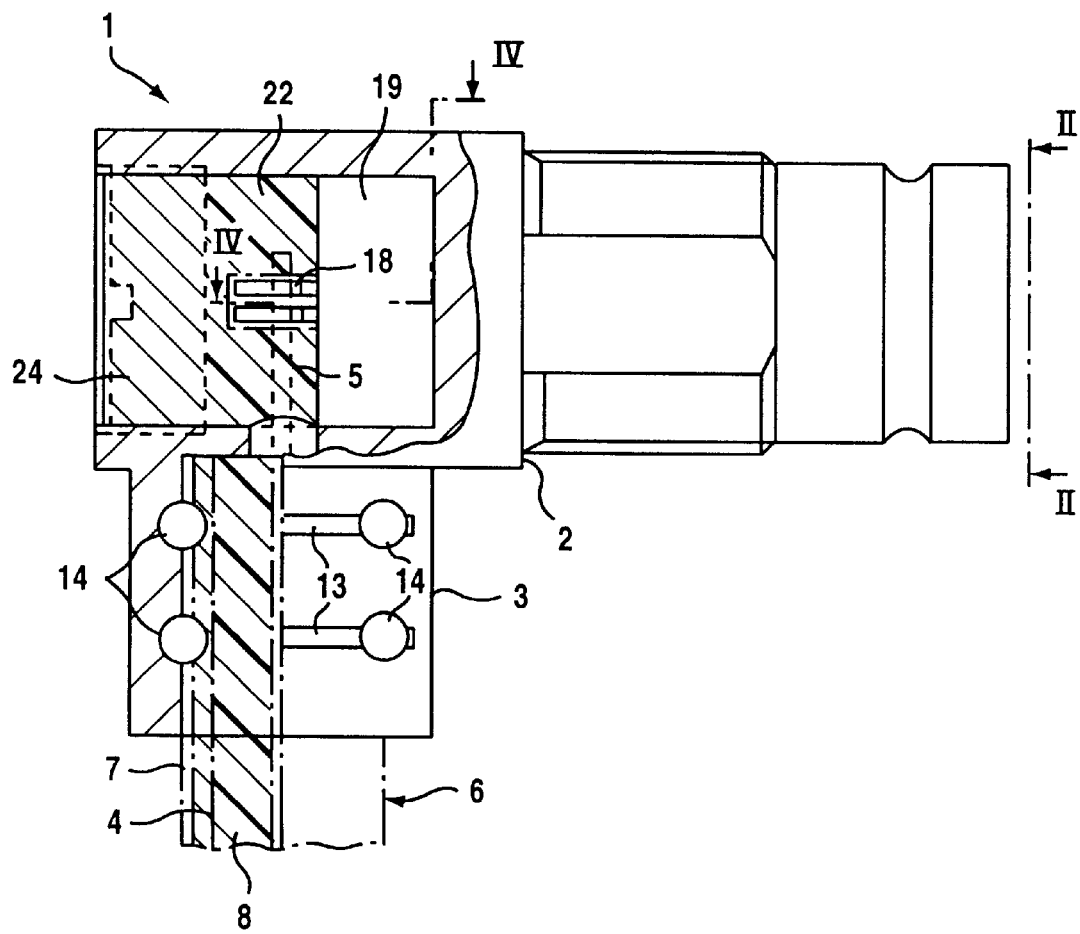
FIG. 1 is a fragmentary, diagrammatic, partly sectional, side-elevational view of an angled coaxial cable coupler.

An embodiment of a solder-free inner conductor contacting of the connection device and of the coaxial cable, which is likewise performed by the IDC technique, is shown in FIGS. 1 and 2. The inner conductor 5 of the end of the coaxial cable 6 prepared in accordance with FIG. 7 may, for instance, have had its insulation entirely removed. In order to provide a connection of the inner conductor 5 and in order to join the inner conductor to a counterpart plug element, the straight housing part 2 has an inner conductor 17, which is joined to one or more press-fitted or soldered-in insulation displacement connection contacts 18 and is retained coaxially in the straight housing part 2 in an insulator element 19 seen in FIG. 4. However, the inner conductor 17 and the insulation displacement connection contact 18 may also be constructed in one piece. The insulation displacement connection contact 18 is constructed with two insulation displacement connection fork tines 20, forming a clamping slit 25 and lateral shoulders 21, with which it rests on an end surface of the insulator element 19. In order to provide an insulation displacement connection of the inner cable conductor 5, a pressure piece 22 of insulating material is also provided. The pressure piece 22 is provided on the side facing toward the insulation displacement connection contact 18 with a recess 23 in such a way that it can rub up onto the contact 18. To that end, a plug screw 24 is provided, which can be screwed from the open end into the straight housing part 2. The plug screw 24 presses the pressure piece 22 against the insulation displacement connection contact 18 and presses the shoulders 21 of the contact 18 against the insulator element 19, so that the contact 18 is immovably and firmly clamped in such a way as to prevent possible actuating motions of the inner conductor 17. Through the use of a suitably adapted geometry and selection of material of the insulation displacement connection fork tines 20 to suit the contact pressure force, a secure low-impedance contact between the inner conductor 17 and the inner cable conductor 5 is assured. A fundamental principle, which is that after the inner cable conductor has been pressed into the insulation displacement connection contact 18 the insulation displacement connection fork tines 20 exert an elastic clamping pressure, remains assured.

The embodiment of the cable connection shown in FIGS. 1–4, is provided for coaxial cables of a certain diameter. The cable connection stub 3 is accordingly cable-adapted in terms of its inner diameter. The clamps 9 that act as an insulation displacement connection (IDC) device are also cable-adapted. The embodiment of FIGS. 1–4 is not intended for coaxial cables of different diameters. In other words, for connecting coaxial cables of different diameters, a different housing with different dimensions of its transverse bores 14 and of the inner diameter of the cable connection stub 3 must be used for each cable.

Figure 5:
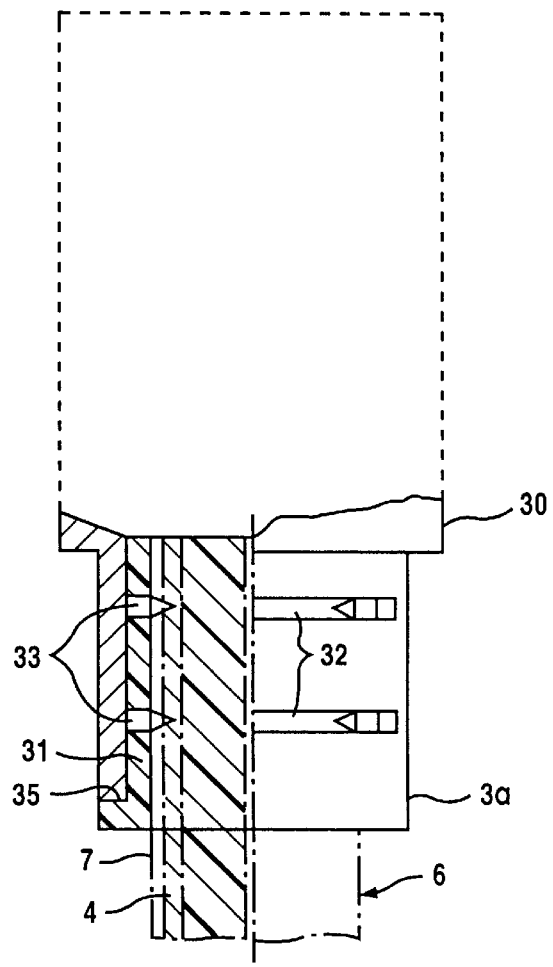
FIG. 5 is a fragmentary, partly sectional, side-elevational view of a coaxial straight plug connector.
Figure 6:
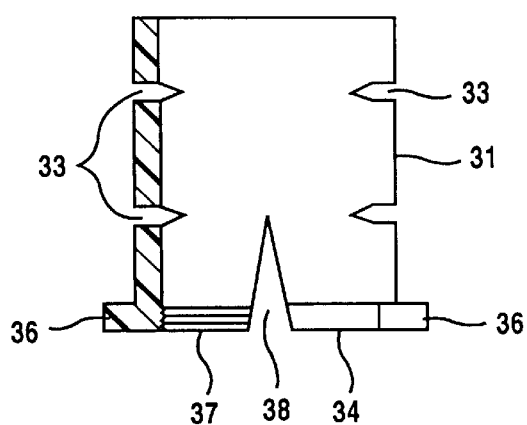
FIG. 6 is a partly sectional view of an additional adapter sleeve for the plug connector of FIG. 5.

An exemplary embodiment of an insulation displacement connection device according to the invention in which coaxial cables of different diameters can be connected is shown in FIGS. 5 and 6, which show a straight cable plug connector. This connector has a continuous straight housing 30 with a cable connection stub 3a that is not bent at an angle and has an inner diameter which is equal to the outer diameter of a cable-adapted adapter sleeve 31 made of insulating material. As is seen in FIG. 6, this adapter sleeve 31 is formed, for example, by an injection-molded plastic part, and accordingly has an inner diameter that is equal to the outer diameter of the coaxial cable 6 through the outer insulating cable sheath 7 thereof. In this way, it is possible to achieve a connection of coaxial cables of different diameters using a standard housing, into which the adapter sleeve 31 is inserted as an additional part, and in which U-shaped clamps 9a (seen in FIG. 8) that are used, for instance, for connecting the respective outer cable conductor, are likewise cable-adapted. In accordance with the embodiment of the cable connection stub 3a, a wall of the adapter sleeve 31 in this case is provided only with recesses being open to the outside and extending crosswise to its center axis in the form of slits 33, and is not provided with additional transverse bores. Thus, the wall of the adapter sleeve 31 is constructed for the introduction of the clamps 9a with the recesses being open to the outside, for instance in the form of the slits 33, which extend crosswise to its center axis and which are accessible through slits 32 in the cable connection stub, in a state in which the adapter sleeve 31 has been inserted into the cable connection stub 3a. In order to ensure that the slits 33 of the adapter sleeve 31 will automatically align with the slits 32 of the cable connection stub, the adapter sleeve 31 is constructed, in the region of an outward-pointing end surface 34 thereof, with laterally protruding protrusions 36, which engage other corresponding recesses 35 in the wall of the cable connection stub 3a and which are disposed in such a way that the slits 33 of the adapter sleeve 31, inserted into the cable connection stub, are located in the region of the slits 32 of the cable connection stub. As a result, the adapter sleeve can be inserted into the cable connection stub in such a way as to prevent relative rotation. Moreover, in the region of its outward-pointing end surface 34, the adapter sleeve 31 is provided on its inner wall surface with a cable clamping zone 37 being formed by sharp-edged grooves, and with slits 38 that are located in the center axis and are open toward the end surface. These slits produce a certain elasticity of the adapter sleeve when the cable is engaged by or engages the cable clamping zone.

Figure 8:
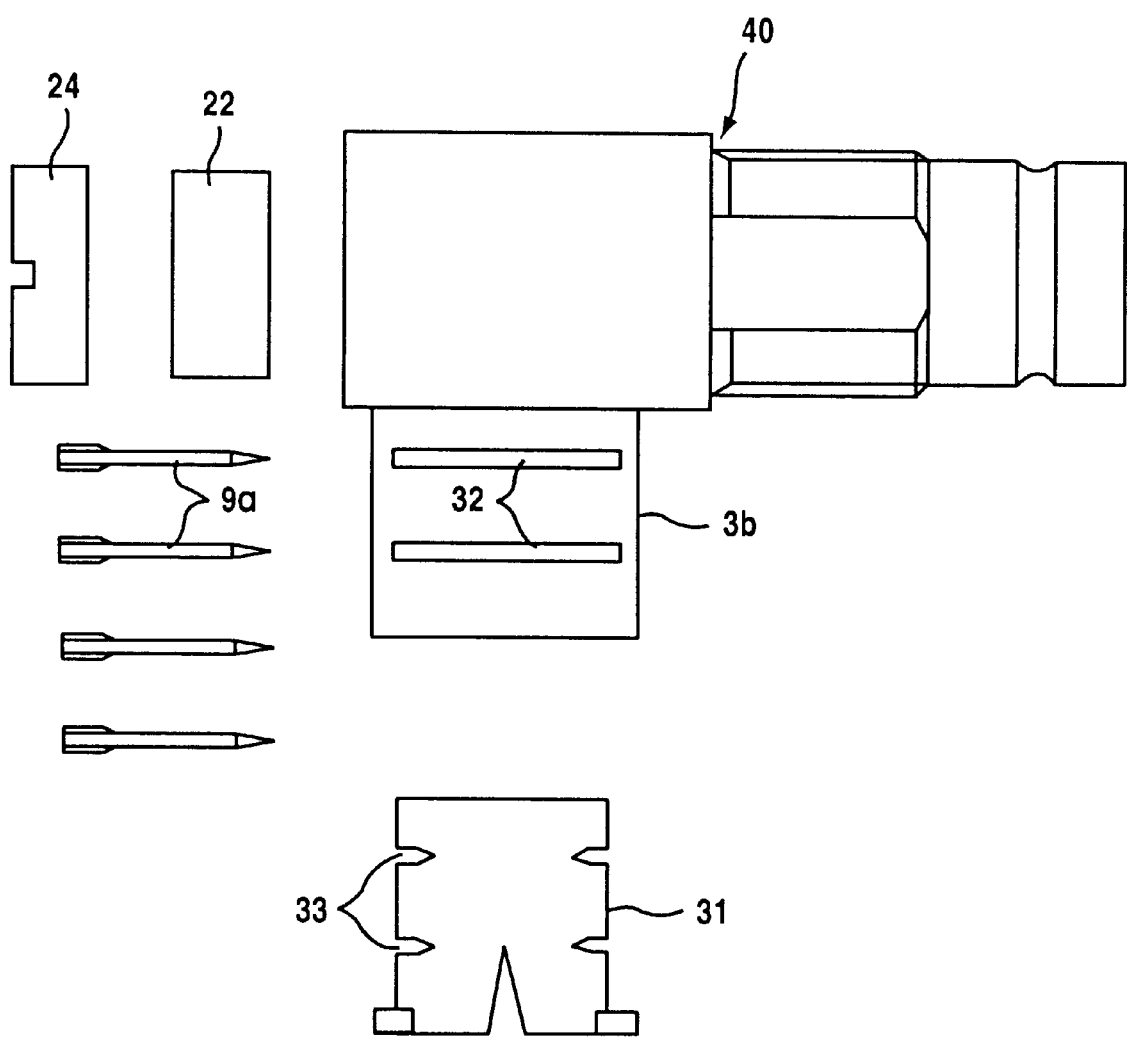
FIG. 8 is an exploded view of a fundamental structure of a coaxial right-angled plug connector with an additional adapter sleeve of FIG. 6.

The structure for a straight cable plug connector of an insulation displacement connection device which is shown in FIGS. 5 and 6 can be provided in a corresponding way for an angled coaxial cable coupler as is shown in FIG. 8. In this insulation displacement connection device, which can likewise be made with a standard housing 40 having an angled cable connection stub 3b for the connection of coaxial cables of different diameters, an adapter sleeve 31 constructed in accordance with FIG. 6 is again used. The outer cable conductor is connected in the manner that was already described for the preceding embodiments, for instance through the use of four-U-shaped, cable-adapted clamps 9a, while the inner conductor connection of this cable coupler can be carried out, as in the embodiment of FIG. 1, with the aid of a pressure piece 22 and a plug screw 24.

Figure 9:
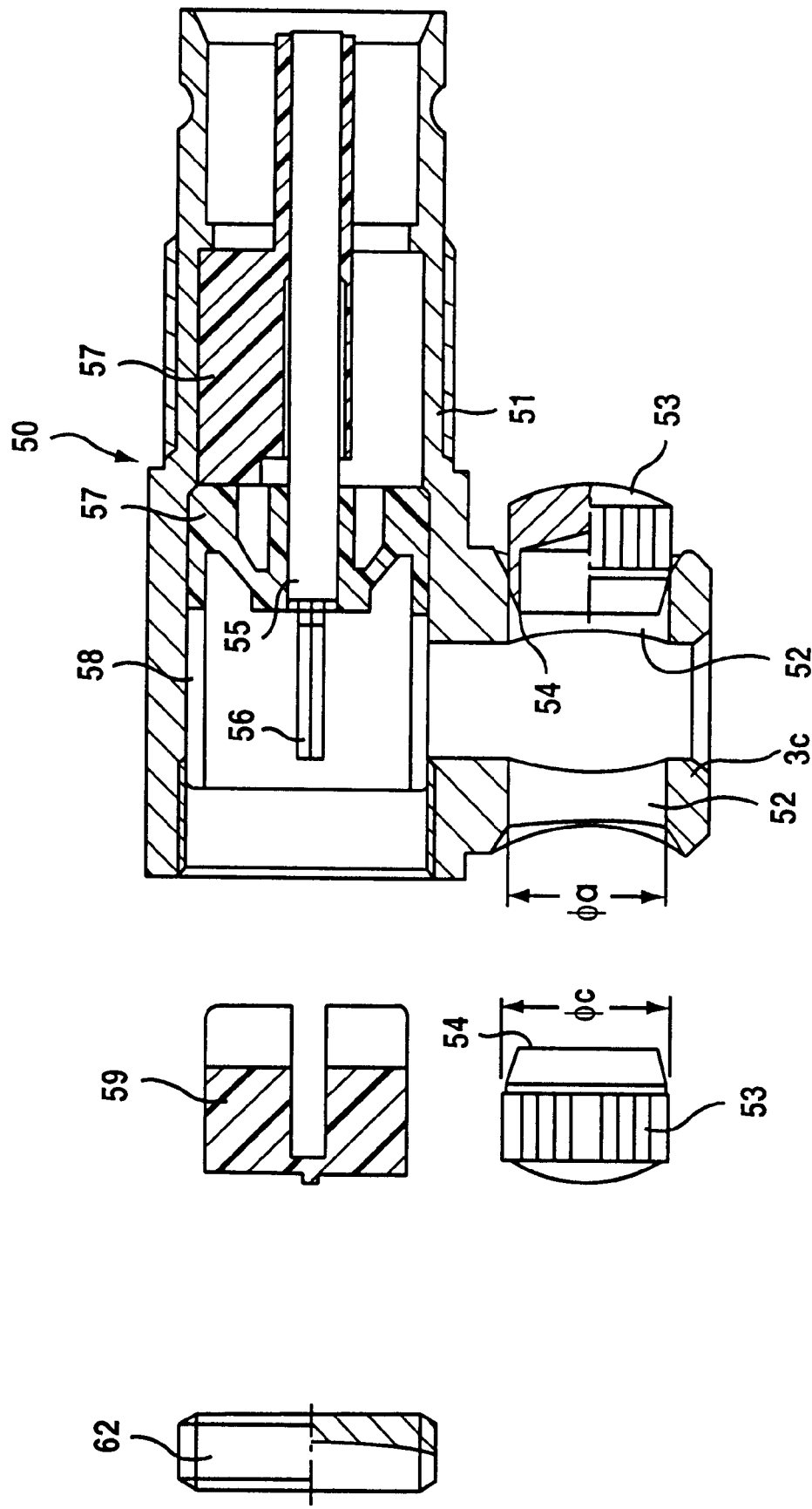
FIG. 9 is an exploded, sectional view of a further embodiment of an insulation displacement connection device for a coaxial right-angled plug connector.
Figure 10:
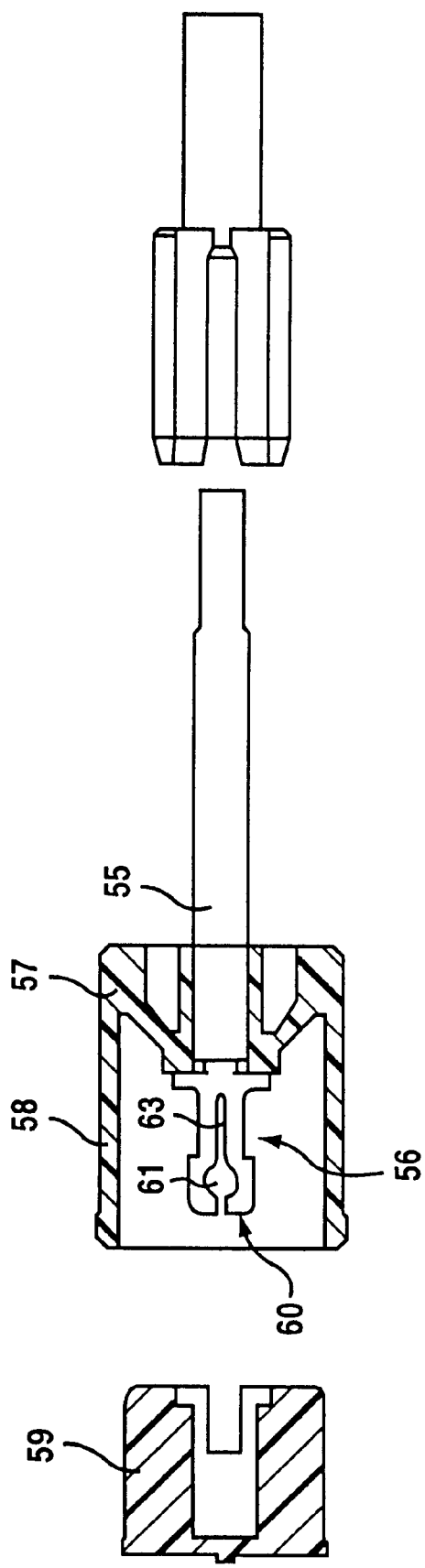
FIG. 10 is an exploded, sectional view of individual parts of the plug connector of FIG. 9.

Finally, FIGS. 9 and 10 show a further embodiment of an insulation displacement connection device according to the invention for an angled coaxial cable coupler that differs from the preceding embodiments in the way in which the outer and inner conductors are connected. A housing 50 of this cable coupler again has a straight housing part 51 for connecting the inner conductor and an angled cable connection stub 3c for receiving a cable end of a coaxial cable 6, wherein the cable end is prepared in accordance with FIG. 7. In this case, the recesses of the cable connection stub 3c are constructed for the device for insulation displacement connection of the cable conductor in the form of radial bores 52 in the wall of the cable connection stub. These bores 52 again extend transversely to the center axis of the cable connection stub, are open to the outside, and extend as far as the connection bore of the cable connection stub. The device for the insulation displacement connection of the outer cable conductor 4 includes at least two conductively constructed clamping plugs 53, which are knurled on their outer periphery and are introduced from opposite sides radially into the cable connection stub 3c and press-fitted self-clampingly into the radial bores 52. On the side facing toward the coaxial cable being introduced into the cable connection stub 3c, the clamping plugs 53 are hollowed out and are constructed with one or more cutting zones 54 extending all the way around them. The clamping plugs 53 are also rounded off on the outer end surface for the sake of adaptation to a tool to be used, and on the opposite end are constructed in such a way that they taper conically, for instance, and are formed in such a way that when pressed onto the coaxial cable, or when the cutting zones 54 cut into the cable sheath and the outer cable conductor, a durable clamping tension is exerted, which in turn assures a gas-tight, low-impedance connection between the outer cable conductor and the clamping plugs 53. To that end, the fit with tension of the cutting zones 54 having the dimension c is accordingly adapted to the diameter a of the radial bores 52.

Figure 4:
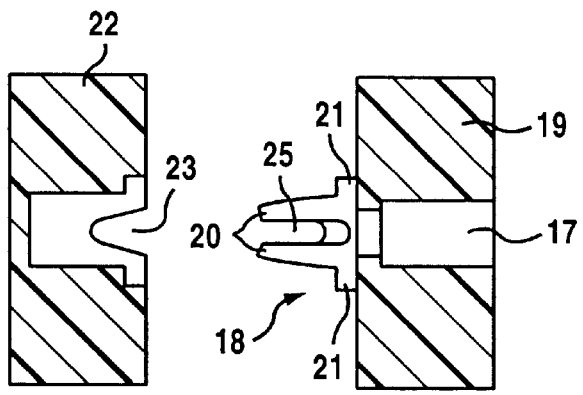
FIG. 4 is a sectional view taken along a line IV—IV of FIG. 1, in the direction of the arrows.

In the embodiment of FIGS. 9 and 10, the connecting of the inner conductor is carried out in a similar way to the embodiment of FIGS. 1 and 4. As in FIG. 4, an inner conductor 55 in the straight housing part 51 is connected to an IDC contact 56 or is constructed in one piece with it and is retained in a one-piece or two-piece insulator element 57 with a bush 58. A pressure piece 59 of insulating material can be inserted into the bush 58 and can be slipped over a head 60 of the contact 56. To that end, the pressure piece 59 is recessed and slit in a manner which is visible from FIGS. 9 and 10. Upon cable assembly, the coaxial cable is thrust into the housing 50, or into its cable-adapted connection stub 3c, and the inner cable conductor enters a contact hole 61 in the head 60 of the contact 56. When the pressure piece 59 is inserted into the bush 58 and when a plug screw 62 is tightened, the inner cable conductor is pressed into a clamping slit 63 of the contact 56. After the inner conductor has been connected, the clamping plugs 53 are inserted into the radial bores 52 and press-fitted, for connection of the outer cable conductor, until the clamping tong jaws 15 strike the cable connection stub 3c and the outer cable conductor is contacted.

A further coaxial cable right-angled plug connector will be described below, with reference to FIG. 11.

Figure 11:
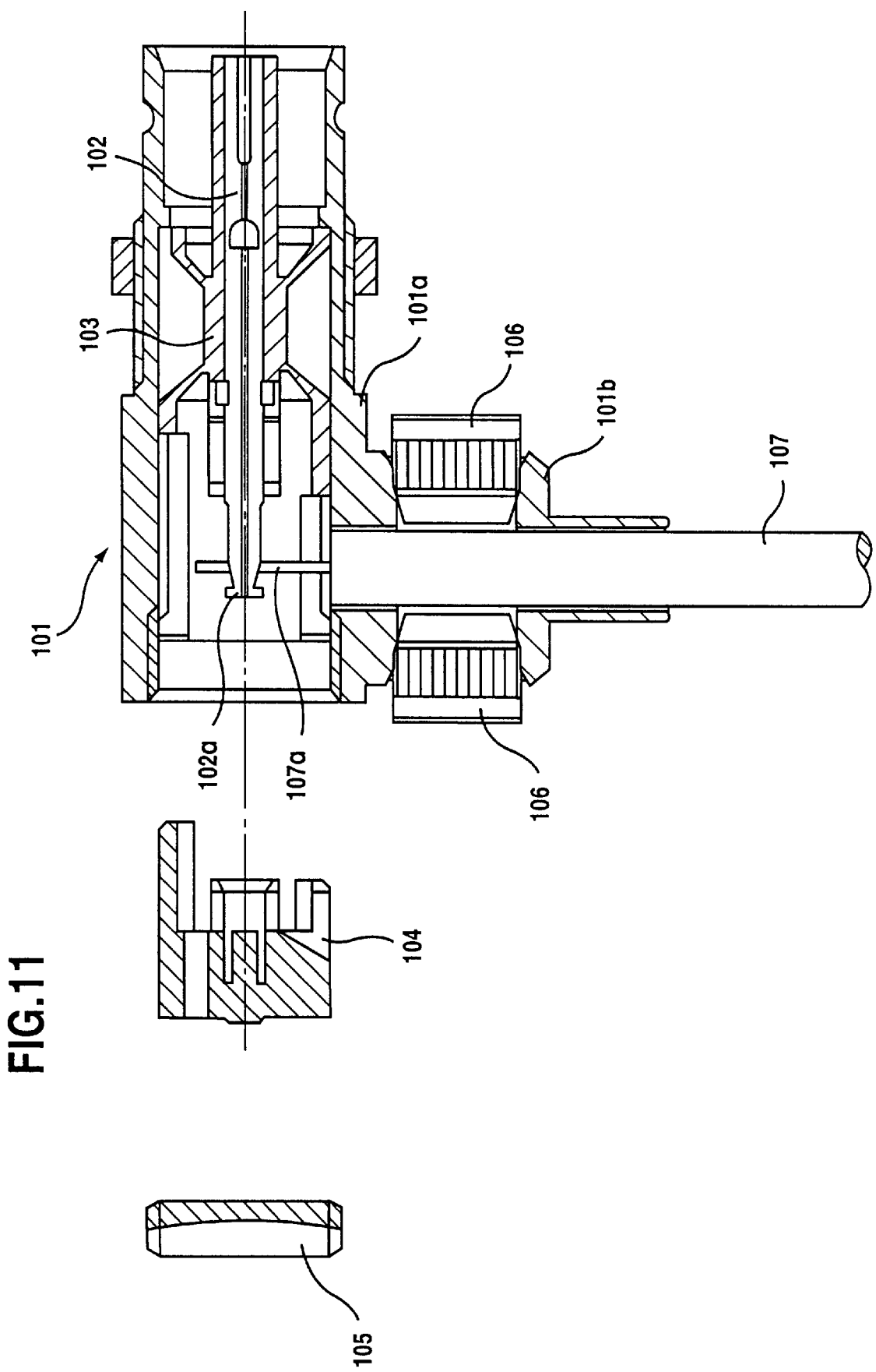
FIG. 11 is an exploded, sectional view of a further embodiment of a coaxial cable right-angle plug connector, in which exemplary embodiments of insulation displacement connection devices according to the invention and an exemplary embodiment of the apparatus according to the invention for guiding conductors to be joined to the insulation displacement connection device are used.

The coaxial cable right-angled plug connector shown in FIG. 11 includes further exemplary embodiments of insulation displacement connection devices constructed according to the invention and an exemplary embodiment of an apparatus according to the invention for guiding conductors to be joined to the insulation displacement connection device. The exemplary embodiments which are mentioned will be described below in conjunction with FIGS. 12–22.

The coaxial cable right-angled plug connector shown in FIG. 11 includes a conductively constructed housing 101, for instance a metal housing, which has a straight housing part 101a and a cable connection stub 101b that is bent at an angle from it.

An inner conductor connection bush 102 is provided in the interior of the straight housing 101a and is guided in an insulator element 103, which serves to insulate the inner conductor connection bush 102 from the housing 101 and to brace and center the inner conductor connection bush 102 inside the straight housing part 101a. The insulator element 103, which can be used as the aforementioned apparatus for guiding conductors to be joined to the insulation displacement connection device, will be described below in even further detail with reference to FIGS. 21 and 22.

Two insulation displacement connection parts in the form of clamping plugs 106 of metal are inserted into the cable connection stubs 101b. On one hand, upon being pressed into or through corresponding recesses serving to introduce the clamping plugs in the cable connection stub 101b, the clamping plugs 106 clamp a coaxial cable 107 introduced into the cable connection stub and in part contact it, that is they contact the outer conductor of the coaxial cable. On the other hand, the clamping plugs 106 are themselves clamped in the corresponding recesses of the cable connection stub. This (outer conductor) insulation displacement connection device will be described in further detail below with reference to FIGS. 12–17.

A pressure piece 104, preferably of insulating material, can be introduced into the left-hand end of the straight housing part 101a, as is seen in FIG. 11. For the sake of making an electrical connection, the pressure piece can be slipped between an inner conductor 107a of the coaxial cable 107 and an inner conductor connecting portion 102a of the inner conductor connection bush 102, and/or onto the inner conductor connecting portion 102a, in order to close off this connecting point. The inner conductor is either completely bared of insulation or only partly bared of insulation (only the outer conductor of the coaxial cable and its outer insulation are removed).

The pressure piece 104 can be introduced into the straight housing part 101a and secured against coming loose from the connecting point through the use of a plug part in the form of a plug screw 105 or the like.

The coaxial cable right-angled plug connector described herein is inserted at its right-hand end, as seen in FIG. 11, into a suitable counterpart. The housing 101 thus comes into electrical contact with the outer conductor of a coaxial cable leading to the counterpart, and the inner conductor connection bush 102 comes into electrical contact with the inner conductor of the coaxial cable leading to the counterpart. In order to make an appropriate intended electrical connection between the coaxial cables leading to the above-described coaxial cable right-angled plug connector and to the aforementioned counterpart, the inner conductor connection bush 102 must therefore be electrically connected to the inner conductor 107a of the coaxial cable 107 leading to the coaxial cable right-angled plug connector, and the housing 101 must be connected to the outer conductor of this coaxial cable 107. The electrical connection between the inner conductor connection bush 102 and the inner conductor 107a of the coaxial cable 107 is effected in such a way that the bared inner conductor 107a of the coaxial cable 107 is soldered to the inner conductor connecting portion 102a of the inner conductor 102, or in such a way that the inner conductor 107a of the coaxial cable 107 with its insulation entirely bared or only partly bared (only the outer conductor of the coaxial cable and its outer insulation is removed), or optionally not bared at all, is contacted and clamped to the inner conductor connecting portion 102a of the inner conductor 102 in accordance with an insulation displacement connection (IDC) process.

The elements that advantageously (but not necessarily) cooperate to make an inner conductor connection by the insulation displacement connection method, that is the inner conductor connection bush 102a, the pressure piece 104 and the plug screw 105, will be described later in even further detail in conjunction with FIGS. 18–20.

The electrical connection between the housing 101 of the coaxial cable right-angled plug connector and the outer conductor of the coaxial cable 107 is effected through the use of the clamping plugs 106 which were already mentioned above but will now be described in more detail.

Through the use of the clamping plugs 106, the housing 101 of the coaxial cable right-angled plug connector and the outer conductor of the coaxial cable 107 are connected mechanically and electrically, using the insulation displacement connection (IDC) method.

The clamping plugs 106 are electrically conductively constructed and are preferably made of metal. Their structure will now be described in detail in conjunction with FIGS. 12–15.

Figure 12:
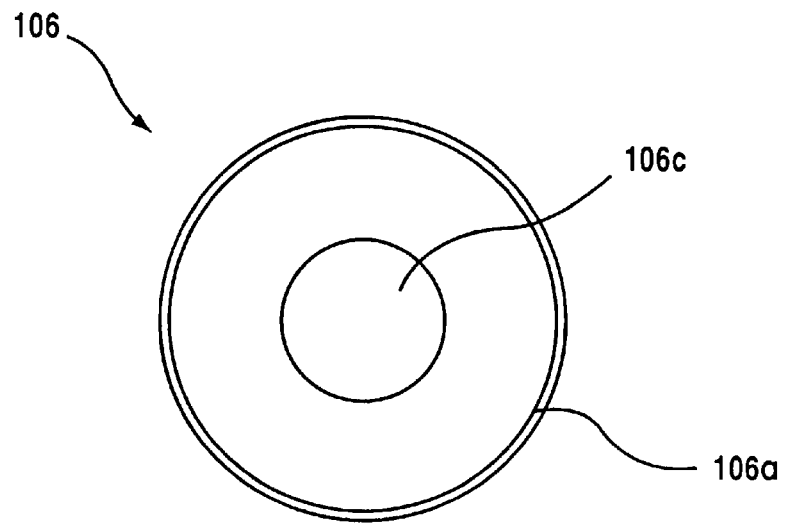
FIG. 12 is a plan view of a clamping plug, as seen from a side to be turned toward the coaxial cable that is to be connected.

FIG. 12 is a plan view on a clamping plug as seen from the side to be turned toward the coaxial cable that is to be connected.

Figure 13:
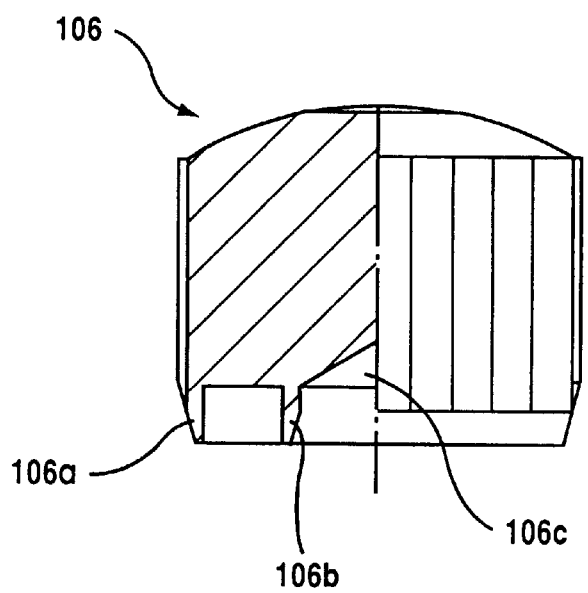
FIG. 13 is a partly sectional, side-elevational view of a clamping plug being modified from the clamping plug shown in FIG. 12.

FIG. 13 is a side view, partly in section, of a clamping plug being modified from the clamping plug shown in FIG. 12.

Figure 14:
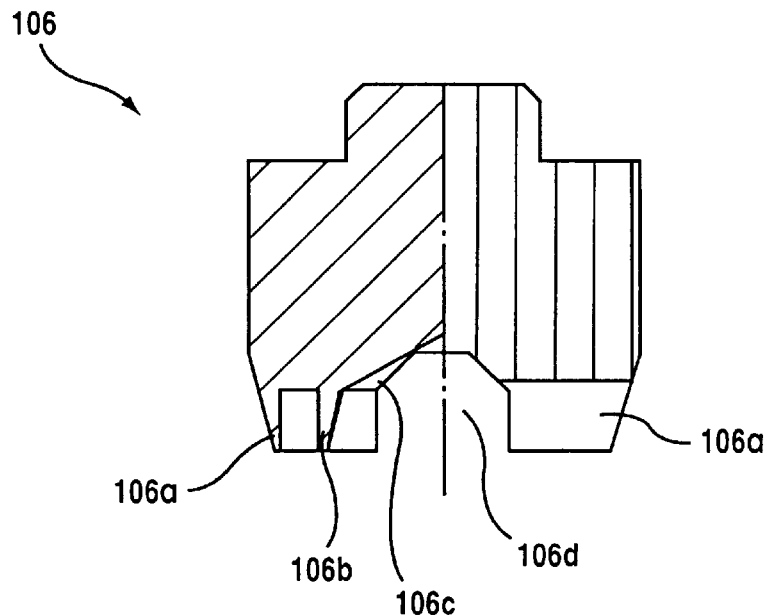
FIG. 14 is a partly sectional, side-elevational view of a clamping plug being modified from the clamping plugs shown in FIGS. 12 and 13.

FIG. 14 is a side view, partly in section, of a clamping plug being modified from the clamping plugs shown in FIGS. 12 and 13.

Figure 15:
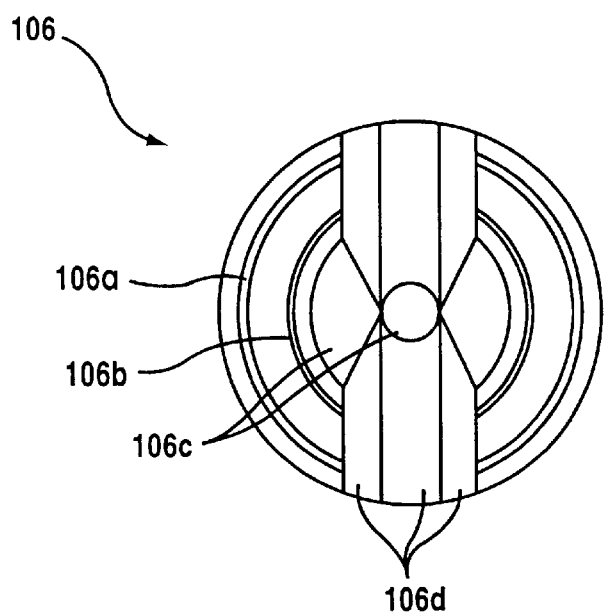
FIG. 15 is a plan view of the clamping plug shown in FIG. 14, from a side to be turned toward the coaxial cable to be connected.

FIG. 15 is a plan view on the clamping plug shown in FIG. 14, from the side to be turned toward the coaxial cable to be connected.

The clamping plug 106 of FIG. 12 has a cutting zone 106a in the form of a knife-like protuberance extending all the way around the outer boundary, on the side to be turned toward the coaxial cable being introduced into the cable connection stub 101b. In the center of the surface of the clamping plug shown in FIG. 12, which surface has a circular cross section, a conical recess 106c is provided.

The clamping plug 106 shown in a side view in FIG. 13, unlike the clamping plug shown in FIG. 12, additionally has a second cutting zone 106b, extending all the way around and being shifted inward from the outer rim, which like the first or outer cutting zone 106a, is likewise in the form of a knife-like protuberance.

As FIG. 13 shows, the clamping plug shown in it, again unlike the clamping plug shown in FIG. 12, is constructed to be tapering conically to a point on its end to be turned toward the cable to be connected and is constructed in such a way that when it is pressed onto a coaxial cable, or when the cutting zones are cut into the cable sheath and the outer conductor of the cable to be connected, a durable clamping tension is exerted, which assures a gas-tight, low-impedance connection between the outer cable conductor and the clamping plugs.

It can also be seen from FIG. 13 that the lateral outer periphery of the clamping plug 106 is knurled. At a location provided with the knurling, the clamping plug has an outer diameter that is larger than the inner diameter of the recesses in the cable connection stub for introduction of the clamping plugs. The recesses will be described below. This is done so that the clamping plugs are durably and firmly clamped upon being pressed into the recess.

As can also be seen from FIG. 13, the clamping plug 106 is rounded off on the end surface or outer end surface that is remote from the cable, in order to adapt it to the tool being used for inserting it into the cable connection stub. Instead of the rounding shown, it is naturally possible for any other arbitrary formation of the corresponding surface to be provided, depending on the tool being used. The rounding shown in FIG. 13 is also suitable for such standard tools as pliers and the like.

The embodiment of the conical recess, with the outer end surface in the knurled portion described with reference to FIGS. 12 and 13, although not explicitly mentioned in each case, is contemplated in an identical or corresponding way for all of the clamping plugs described herein.

The clamping plug of FIGS. 14 and 15, unlike the clamping plug shown in FIG. 13, has another recess 106d extending crosswise over the entire surface, on the side to be turned toward the cable that is to be connected.

In the present exemplary embodiment, this recess 106d has a cross section that is assembled from straight line segments but is essentially semicircular. However, there is no limitation to this particular cross-sectional form of the recess 106d. The only decisive factor is that the recess 106d be capable of receiving in itself a portion of the cable to be connected.

Figure 16:
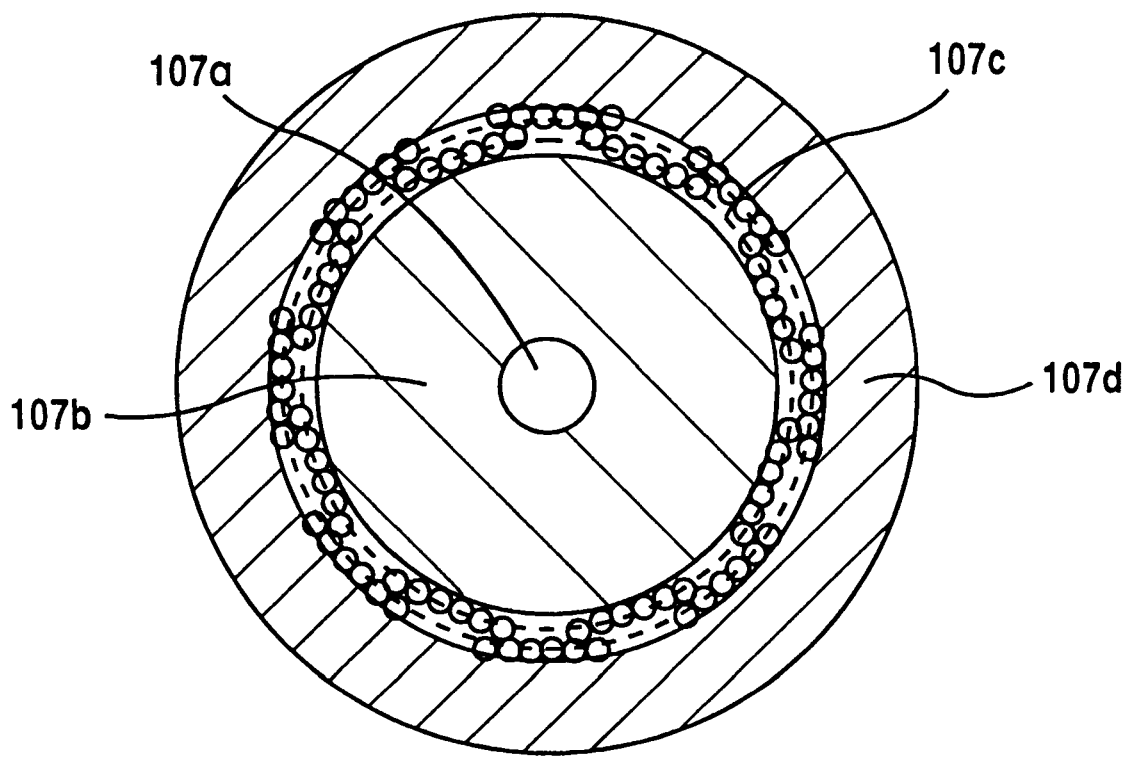
FIG. 16 is a cross-sectional view of a coaxial cable to be introduced into a cable connection stub of the coaxial cable right-angled plug connector shown in FIG. 11.

For that purpose, the width of the recess 106d is preferably dimensioned in such a way that it is substantially larger than the diameter of the inner conductor 107a but somewhat smaller than the inner diameter of the outer cable conductor 107c (see FIG. 16).

In the region of the recess, encompassing cutting zones 106a and 106b are interrupted in the clamping plug of FIG. 13. In order to enable guiding the clamping plugs described above into contact as intended with the coaxial cable to be connected, the cable connection stub 101b, as already mentioned above, has recesses for the insertion of the clamping plugs 106.

The recesses are constructed as recesses extending crosswise relative to the center axis of the cable connection stub 101b. The recesses are open toward the outside and extend from the outer surface of the cable connection stub as far as the connecting bore of the cable connection stub that receives the cable to be connected. In other words, they are radial bores that extend through the wall of the inner, hollow, cable connection stub.

When the insulation displacement connection is made, the coaxial cable 107 is first introduced into the cable connection stub 101b.

This coaxial cable 107 will now be described, while referring to FIG. 16.

FIG. 16 is a cross-sectional view of the coaxial cable to be introduced into the cable connection stub 101b.

The coaxial cable has the following components, as seen in order from the inside outward: the inner cable conductor 107a, an inner insulation 107b, the outer cable conductor 107c and an outer insulation 107d.

The outer cable connector is constructed as a shielding mesh which is assembled from stranded wires.

Once the coaxial cable 107 has been inserted into the cable connection stub 101a, in accordance with the present exemplary embodiment two clamping plugs are pressed from opposite sides of the cable connection stub into the correspondingly disposed bores.

As is apparent from the above description, the clamping plug 106 and the cable connection stub 101b are constructed, disposed and dimensioned in such a way that when the clamping plug is pressed into the cable connection stub, no special tool whatever is needed. Instead, a commercially available pliers or the like can be used.

When the clamping plugs 106 are pressed into the cable connection stub 101b, the outer insulation 107d of the coaxial cable 107 is cut open by the cutting zones of the clamping plugs until the cutting zones 106a and 106b finally come into contact with the outer cable connector 107c.

Once the outer cable connector is reached by the cutting zones of the clamping plugs, or after a certain distance has been covered later, the knurled portion of the clamping plugs 106 comes into engagement with the respective bores in the cable connection stub, so that the clamping plugs 106 are firmly clamped in their respective bores. Since the clamping plugs are of such electrically conductive material as metal or the like, a secure electrical connection between the outer cable connector and the housing of the coaxial cable right-angled plug connector is thus assured.

In this state, the connected coaxial cable is clamped between the clamping plugs that have been inserted from opposite sides of the cable connection stub.

However, the way in which they are clamped depends on the particular embodiment of the clamping plug being used.

If the clamping plugs of FIGS. 12 and 13, with the cutting zone extending all the way around, are used, then the cutting zones facing one another in the two clamping plugs can approach one another up to a distance that is approximately equivalent to the outer diameter of the outer cable connector, or somewhat less. Compression that progresses past this point should be avoided if at all possible, because otherwise the outer cable connector could be cut apart by the cutting zones of the clamping plugs.

If the clamping plugs of FIGS. 14 and 15 are used, then the opposed cutting zones of the two clamping plugs can approach one another up to a spacing distance that is approximately equivalent to the diameter of the stranded wires that form the outer cable connector.

This will be described in further detail below with reference to FIG. 17.

Figure 17:
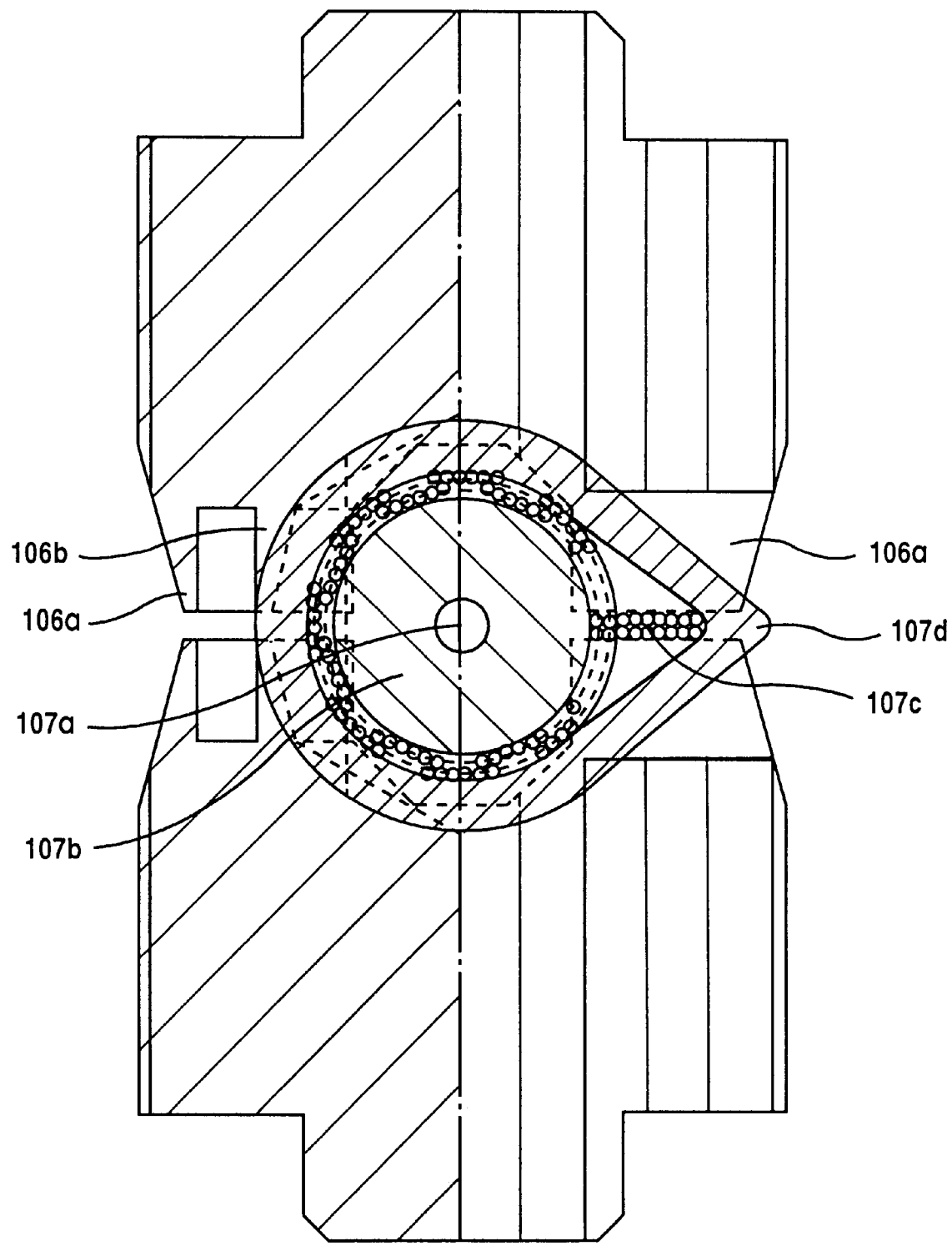
FIG. 17 is a cross-sectional view of a coaxial cable being clamped between two clamping plugs of FIGS. 14 and 15.

FIG. 17 shows a coaxial cable clamped between two clamping plugs of FIGS. 14 and 15.

As can be seen from FIG. 17, the majority of the coaxial cable is received in the respective opposed groove-like recesses 106d of the clamping plugs. Inside the recesses 106d of the clamping plugs, there are no cutting zones, as has already been mentioned. The central portion of the coaxial cable received in the recesses 106d of the clamping plugs can therefore not be damaged from being cut (too far) by the cutting zones, regardless of the mutual spacing of the two clamping plugs.

In contrast to this, the lateral portions of the coaxial cable that are not received in the recesses 106d are cut open by the cutting zones 106a and 106b that are provided along the edge of the clamping plugs, next to the recesses 106d.

When the lateral portions of the coaxial cable are cut open in this way, the outer insulation 107d is first severed in the usual way. After the outer insulation is severed, the cutting zones again come into contact with the outer cable connector 107c. However, as the clamping plugs are pressed farther inward, the outer cable connector is not cut apart, because at this lateral point it is capable of shifting in the pressing-in direction of the clamping plugs.

The final state of a connection that is made in this way can be seen from the right-hand half of FIG. 17. The stranded wires, which were originally distributed uniformly over the circumference of the coaxial cable, had been compressed to a large-area, thin region, located between the cutting zones 106a and 106b of the opposed clamping plugs. The outer insulation of the cable is correspondingly deformed.

As can also be seen from the right-hand half of FIG. 17, when an insulation displacement connection is made in this way, a very large-area contact is brought about between the clamping plugs and the outer cable connector. The electrical connection being made in this way is thus of the highest quality.

An insulation displacement connection device has thus been created in the manner described above, that without major additional manufacturing effort or expense, assures such a simple, secure connection of the outer cable connector that above all the connection can be made quickly and safely, without special tools, even by less-qualified mechanics or non-specialists.

Although the invention has been described above in terms of a very specific exemplary embodiment, it is not restricted thereto but instead can be modified in the most varied ways.

For instance, the coaxial cable to be connected need not necessary be clamped in place between two opposed clamping plugs. Instead, an arbitrary number of clamping plugs converging upon the coaxial cable from arbitrary directions can be used. The use of only a single clamping plug would also be conceivable, given a suitably deep construction of the groove-like recess 106d. It is also possible for the clamping plugs to be constructed with a cross section other than a circular cross section. This opens up the possibility of specifying a predetermined orientation of the groove-like recess within the cable connection stub and thus of averting damage to the coaxial cable that is to be connected.

The inner conductor connecting portion 102a, the pressure piece 104 and the plug screw 105 will now be described in detail, referring to FIGS. 1 and 18–20.

These elements serve to electrically connect a first electrical conductor (which in the present exemplary embodiment is in the form of the inner conductor connection bush 102 of the coaxial cable right-angled plug connector) to a second electrical conductor (which in the present exemplary embodiment is in the form of the inner conductor 107a of the coaxial cable 107 leading to the coaxial cable right-angled plug connector) by the insulation displacement connection method.

The inner conductor connecting portion 102a is an element which is constructed especially for mechanically and electrically connecting the inner conductor 107a of the coaxial cable 107 to the inner conductor connection bush 102. It can be integrally formed with the inner conductor connection bush 102 or, as a separate part, it may be connected in an arbitrary way to the inner conductor connection bush 102.

Figure 18:
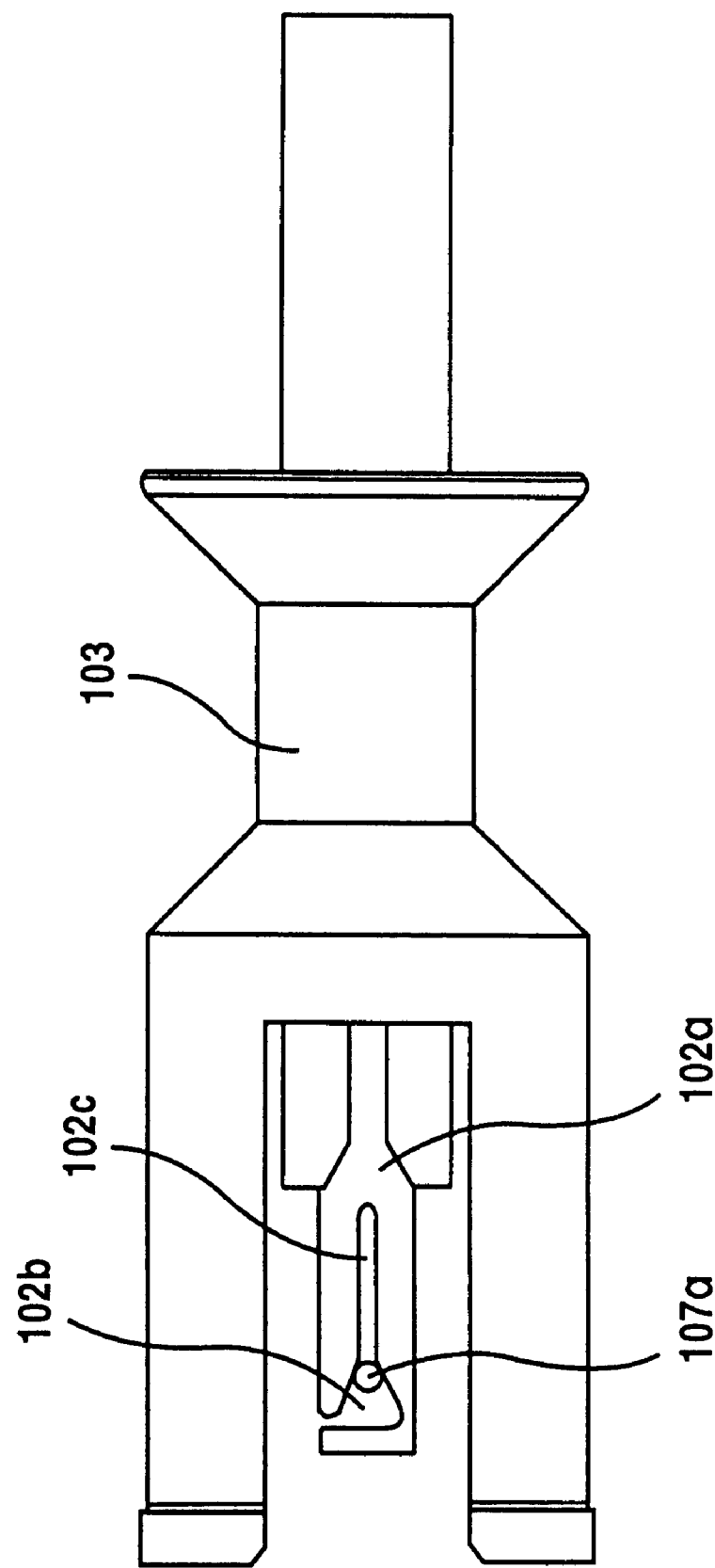
FIG. 18 is a top-plan view of the coaxial cable right-angled plug connector shown in FIG. 11, omitting its housing.

The inner conductor connecting portion 102a is shown on a larger scale in FIG. 18, in a view that is modified as compared with FIG. 11.

FIG. 18 is a view of the coaxial cable right-angled plug connector shown in FIG. 11, that is seen from above, with its housing omitted.

As can be seen from FIG. 18, the inner conductor connecting portion 102a has a recess 102b and a slit 102c that adjoins the recess laterally.

Both the recess 102b and the slit 102c extend all the way through the entire inner conductor connecting portion 102a, or in other words from one side of the inner conductor connecting portion 102a to its opposite side.

The recess 102b is constructed and dimensioned in such a way that the inner conductor 107a, which is likewise shown in FIG. 18 and is part of the coaxial cable 107, can be introduced without problems, or in other words essentially without resistance, into it. This kind of problem-free introduction is possible even if the insulating layer provided between the inner and outer conductors of the coaxial cable 107 has not been bared.

The recess 102b is also constructed in such a way that it gradually narrows toward the slit 102c or in other words it merges continuously with the slit.

The slit 102c is constructed in such a way that its width is less than the outer diameter of the bared inner conductor 107a of the coaxial cable 107. Slit jaws that form the slit are constructed to be so sturdy that when the inner conductor 107a is pressed in, they cut into it and do not yield but instead maintain their original position relative to one another essentially unchanged. This is the case even if an inner conductor that is not bared or is only partially bared is pressed in. In that case the slit jaws additionally cut open the insulation down to the inner conductor.

The inner conductor connecting portion 102a has a hollow-cylindrical cross section, although that cannot be seen from the drawings. The recess 102b and the slit 102c extend through both opposed portions of the wall.

In the making of the electrical and mechanical connection between the inner conductor 107a and the inner conductor connecting portion 102a, the coaxial cable 107 is first introduced, with the entirely or partly bared inner conductor 107a, into the cable connection stub 101b. If it protrudes sufficiently far out of the coaxial cable 107b, the entirely or partly bared inner conductor 107a is then automatically guided by the suitably positioned recess 102b of the inner conductor connecting portion 102a, or in other words it is threaded into it. As is shown in FIG. 11, the free end of the inner conductor 107a can protrude to a considerable distance from the side of the inner conductor connecting portion 102a facing away from the coaxial cable. In this state, the clamping plugs 106, which are premounted as shown in FIG. 11, are pressed into the cable connection stub 101b through the use of some suitable tool, such as pliers or the like. As already described above, in the process a secure mechanical and partial electrical connection is made between the cable connection stub 101b and the coaxial cable 107.

In this operation, the coaxial cable 107 is deformed and under some circumstances is exposed to asymmetrically acting forces, which may possibly even cause motion of the inner conductor 107a that protrudes from the coaxial cable 107.

However, the lateral freedom of motion of the inner conductor 107a is restricted by the recess 102b of the inner conductor connecting portion 102a, in such a way that the inner conductor 107a, although it is movable within the recess 102b, is incapable of leaving the recess.

Finally, in terms of FIG. 11, the pressure piece or part 104 is introduced into the housing from the left-hand side of the straight housing part 101a.

The pressure part 104 is especially constructed so as to press the inner conductor 107a of the coaxial cable 107 that is introduced into the recess 102b, into the slit 102c.

The pressure part 104 will now be described in conjunction with FIGS. 19 and 20.

Figure 19:
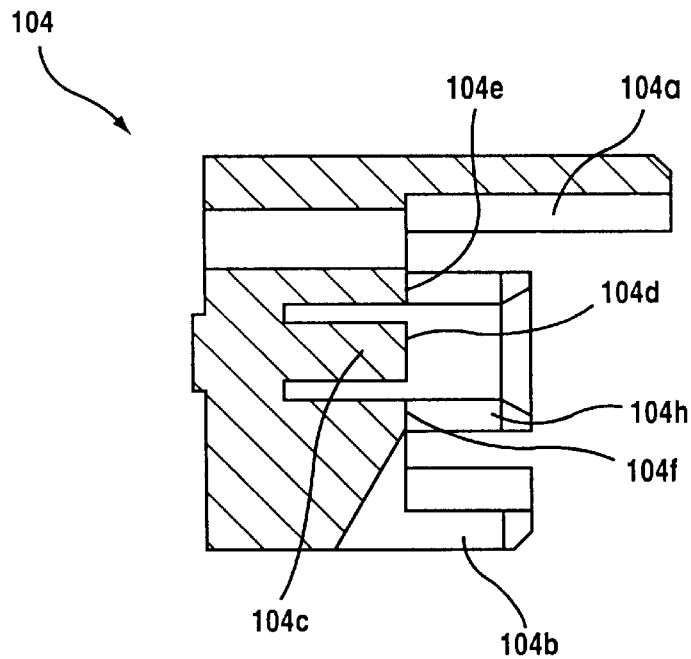
FIG. 19 is an enlarged, sectional view of a pressure part that is already shown in FIG. 11.

FIG. 19 is an enlarged view of the pressure part 104 that was already shown in FIG. 11.

Figure 20:
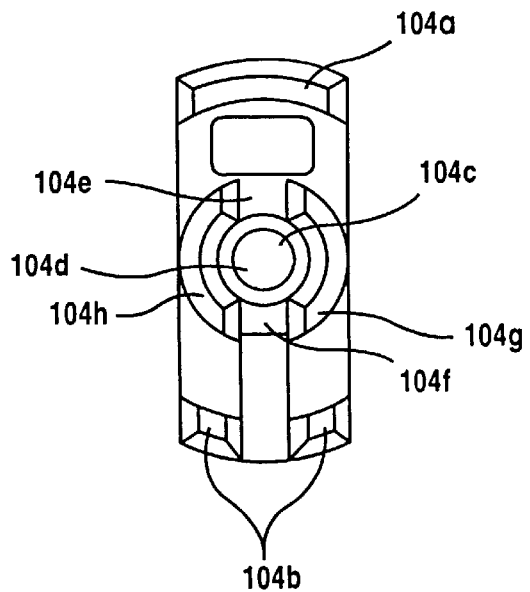
FIG. 20 is an elevational view of the pressure part shown in FIG. 19 as seen from the right in terms of that figure.

FIG. 20 is a view of the pressure part as seen from the right in terms of FIG. 19.

The pressure part 104 has upper and lower guide ribs 104a and 104b which, upon the introduction of the pressure part 104 into the housing 101 of the coaxial cable right-angled plug connector, come to engage corresponding counterparts of the plug and aid in preventing the pressure part 104 from being introduced into the coaxial cable right-angled plug connector in an unintended orientation.

The pressure part 104 also has a cylindrical pressing element 104c, with a middle frontal pressing surface 104d on an end surface. The outer diameter of the cylindrical pressing element 104c is approximately equal to the inner diameter of the hollow-cylindrical inner conductor connecting portion 102a, so that when the pressure part 104 is inserted into the coaxial cable right-angled plug connector, it automatically enters into the hollow-cylindrical inner conductor connecting portion 102a and there its middle pressing surface 104d comes into contact with the inner conductor 107a that is passed through the inner conductor connecting portion 102a.

An upper pressing surface 104e is provided on the portion of the pressure part 104 located above the pressing element 104c as seen in FIG. 19. Upon insertion of the pressing surface 104 into the coaxial cable right-angled plug connector, this surface comes automatically into contact with the portion of the inner conductor 107a that protrudes upward, in terms of FIG. 11, out of the inner conductor connecting portion 102a.

A lower pressing surface 104f is provided on the portion of the pressure part 104 located below the pressing element 104c as seen in FIG. 19. Upon insertion of the pressing surface 104 into the coaxial cable right-angled plug connector, this surface comes automatically into contact with the portion of the inner conductor 107a that in terms of FIG. 11 extends below the inner conductor connecting portion 102a.

The middle pressing surface 104d, the upper pressing surface 104e and the lower pressing surface 104f are located in one and the same plane and upon insertion of the pressure piece 104 into the coaxial cable right-angled plug connector come into contact with the inner conductor 107a more or less simultaneously at three close-together points located on a line.

Upon the insertion of the pressure part 104 into the coaxial cable right-angled plug connector, the wall of the hollow-cylindrical inner conductor connecting portion 102a, including the recesses and slits provided in the upper and lower portions of the wall in terms of FIG. 11, enters into a cylindrical jacket-like recess provided in the pressure part 104 around the cylindrical pressing element 104c.

Such a configuration makes it possible for the inner conductor 107a to be pressed into the slits provided in the upper and lower walls of the inner conductor connecting portion 102a, in terms of FIG. 11, without deformation of the inner conductor 107a with respect to the direction of insertion.

In order to preclude deformation of the inner conductor 107a at right angles to the direction of insertion as well, the pressure part has two boundary elements, located to the right and to the left next to the pressing surfaces which are located one above the other, in the form of protruding half-shells 104g and 104h, between which the inner conductor 107a comes to rest when the pressure part 104 is introduced into the coaxial cable right-angled plug connector, and which limit the freedom of motion of the inner conductor 107a crosswise to the direction of insertion.

Due to the fact that the outer diameter of the cylindrical pressing element 104c of the pressure part 104 is approximately equivalent to the inner diameter of the hollow-cylindrical inner conductor connecting portion 102a, and due to the fact that the upper and lower pressure surfaces 104e and 104f are also dimensioned adequately large, and moreover because of the fact that the recess 102b of the inner conductor connecting portion 102a merges gradually with the slit 102c, the inner conductor 107a is always reliably engaged by all of the pressing surfaces 104d, 104e, 104f, entirely independently of its position inside the recess 102b, and is pressed as intended into the slit 102c (optionally with lateral guidance by the boundary surfaces of the recess 102b). Misalignment of the inner conductor 107a by the pressing surfaces, tilting of the inner conductor upon being pressed in, and/or improper insertion of the inner conductor into the slit 102c, are thus precluded.

Since the width of the slit 102c is smaller than the diameter of the inner conductor 107a, the inner conductor is pressed into the slit without being deformed and is thus firmly and durably joined to it mechanically and electrically.

Not inconsiderable force is needed to press the inner conductor 107a into the slit 102c. This force can be brought to bear with the aid of the plug screw 105. In other words, the introduction of the pressure part 104 into the coaxial cable right-angled plug connector can be accomplished by screwing the plug screw into the housing of the coaxial cable right-angled plug connector, so that no special tools whatever are needed to do this.

Although the inner conductor connection has been described above in terms of a very specific exemplary embodiment, it is not limited to that and instead can be modified in the most varied ways.

For instance, the inner conductor connecting portion 102a need not be constructed as either cylindrical or hollow on the inside. On the contrary, it can assume any arbitrary form, as long as the recess and the slit can be provided in it in the manner described. The pressure part in that case must naturally be adapted appropriately to the altered conditions.

Nor need the recess 102b have the teardrop shape shown in the drawings, but instead it can have any arbitrary shape, although a narrowing of the recess toward the slit does have an advantageous effect.

It is understood that the recess need not have the lateral opening shown in the drawings either, since the opening has been provided for production reasons.

Nor is there any restriction that the electrical conductors to be connected be the parts of plugs or connectors described herein. They may instead be electrical conductors serving arbitrary purposes and being constructed arbitrarily.

Moreover, the pressing surfaces 104d, 104e and 104f, unlike that which is shown in the drawings, need not necessarily be flat surfaces. Instead, the pressing surfaces may be curved (for instance, concavely), in order to position the inner conductor, upon insertion of the pressure part into the coaxial cable right-angled plug connector, inside the pressing surfaces, in such a way that beginning at this exactly defined starting position, even more reliable introduction of the inner conductor to the beginning of the slit will be assured.

The insulator element 103 shown in FIG. 11 will now be described in further detail.

As already mentioned above, the insulator element 103 serves to guide, or in other words to brace and center, an inner conductor (in the present exemplary embodiment, it is in the form of an inner conductor connection bush 102 of a coaxial cable right-angled plug connector) in an outer conductor (in the present exemplary embodiment, it is in the form of a housing 101 of a coaxial cable right-angled plug connector). At the same time, as its name already implies, it has the function of insulating the inner conductor and the outer conductor from one another electrically.

Figure 21:
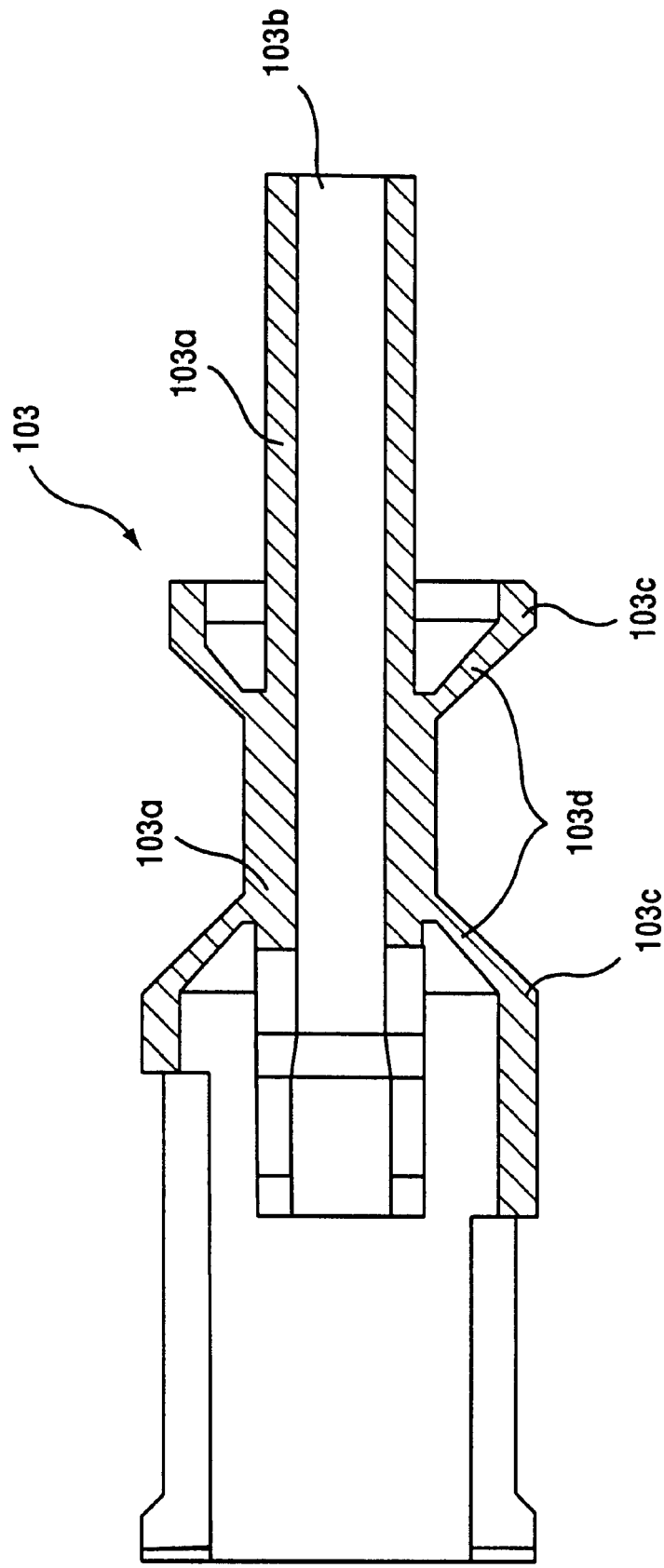
FIG. 21 is an enlarged, sectional view of the portion of the coaxial cable right-angled plug connector shown in FIG. 11, including the insulator element of the invention.
Figure 22:
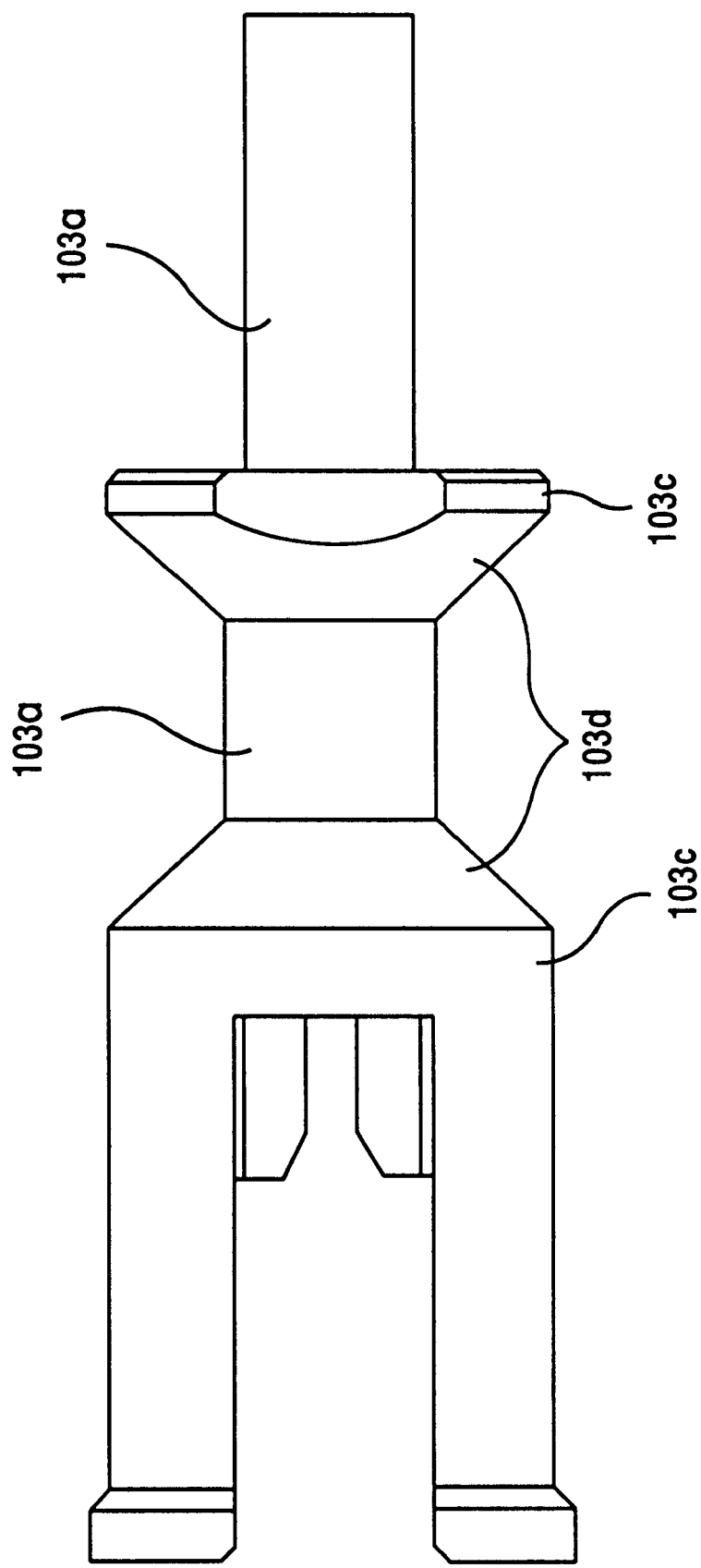
FIG. 22 is a top-plan view of FIG. 21 showing the portion of the coaxial cable right-angled plug connector shown therein.

The insulator element 103 is shown on a large scale in FIGS. 21 and 22.

FIG. 21 shows an enlarged sectional view of the portion of the coaxial cable right-angle plug connector shown in FIG. 11, which portion includes the insulator element according to the invention.

FIG. 22 shows a view from above of the portion of the coaxial cable right-angle plug connector shown in FIG. 21. The insulator element 103 of interest in this case, or the portion of interest of the insulator element 103 in this case, is shown in section (shaded) in FIG. 21.

As is visible particularly in FIG. 21, the insulator element 103 has an inner conductor receiving portion 103a for receiving the inner conductor, which is not shown in FIGS. 21 and 22. The inner conductor receiving portion 103a has a continuous opening 103b in its center for receiving the inner conductor. It is constructed approximately hollow-cylindrically. In the finally assembled state, the inner conductor is entirely annularly surrounded by the inner conductor receiving portion 103a with full-surface contact therewith.

Bracing zones 103c extend from the inner conductor receiving portion 103a to the outer conductor and serve to assure that the insulator element 103 and the inner conductor received by it are braced in centered fashion inside the outer conductor, although the latter is not shown in FIGS. 21 and 22.

The bracing zones 103c extend obliquely from the inner conductor receiving portion to the outer conductor, or in other words in an inclined fashion relative to the surface normal of the inner conductor (in the present exemplary embodiment, this coincides with the surface normal of the inner conductor receiving portion 103a) to the axial direction of the inner conductor (in the present exemplary embodiment, this coincides with the axial direction of the inner conductor receiving portion and the axial direction of the insulator element), or they are inclined away from that direction. The inclines 103d of the bracing zones 103c are frustoconical, and preferably are conical sheath-like thickenings of the inner conductor receiving portion 103a that extend from the inner conductor receiving portion 103a to the outer conductor and are coaxial with the inner conductor, or are extensions that begin at the aforementioned thickenings. The region between the inner conductor receiving portion 103a and the bracing zones 103c is preferably, but not necessarily, constructed as at least partial hollow (see FIGS. 11 and 21).

Finally, the inclines 103d of the bracing zones 103c merge with portions that extend parallel to the inner surface of the outer conductor.

The inclines 103d and the adjoining parallel portions are constructed and dimensioned in such a way that the insulator element 103, which includes the inner conductor receiving portion 103a and the bracing zones 103c, can be introduced so as to fit into the outer conductor.

The inner conductor receiving portion 103a and the frustoconical or conical sheath-like bracing zones 103c provided coaxially with it are each constructed to be entirely symmetrical within sectional planes extending at right angles to the inner conductor, or in other words to be symmetrical with respect both to the inner conductor and arbitrary radial lines. Preferably, they are integrally constructed as a unit.

Due to the provision of inclines and due to the entirely symmetrical element, the insulator element has abrupt geometrical changes, where an abrupt change in the proportion of insulating material provided per unit of volume between the inner conductor and the outer conductor can occur in neither the circumferential nor the axial direction.

If, as is diagrammatically suggested in FIG. 21, the inner conductor receiving portion 103a is made thinner in axial portions in which there is a bracing zone 103 than in places where this is not the case, then it is even possible for the insulator element to have an essentially constant amount of insulating material over its entire length between the inner and outer conductors per axial direction portion, thereby making for even greater uniformity and ease of manipulation of the electrical properties of the electrical conductor including the inner and outer conductors.

Through the use of a suitable choice of the insulating material used to make the insulator element, by suitably defining the quantity of insulating material used per axial directional portion of the insulator element, and through the use of a suitable local distribution of the insulating material within the insulator element, it is thus possible for the electrical properties of the electric line including the inner and outer conductors, such as the wave resistance and the like, to be adjusted simply and nevertheless independently of location, and reliably and constantly accurately to a desired value, such as 75 Ohms, which is usual for coaxial cables.

Although the invention has been described above in terms of a very specific exemplary embodiment, it is not limited to this embodiment but instead can be modified in the most varied ways.

For instance, the number of bracing zones 103, counter to that which the drawings show, need not necessarily be two. Depending on existing conditions, and in particular on the length of the insulator element, it can be fixed at an arbitrary value.

Moreover, the inclines 103d of the various bracing zones 103c, counter to that which the drawings show, need not necessarily extend straight away from the inner conductor receiving portion but instead can be arbitrarily curved.

Moreover, the above-described provision of surface portions of the bracing zones that extend in inclined fashion relative to the surface normal of the inner conductor is not limited to inclinations toward or away from the axial direction of the insulator element. Instead or in addition, the inclination can also be toward or away from the direction that is at right angles to the surface normal and the axial direction.

Besides this, there is also no restriction that the inner conductor and the outer conductor be the indicated parts of plugs or connectors. They may instead be inner conductors and outer conductors serving arbitrary purposes in arbitrary devices, including inner conductors and outer conductors of a coaxial cable.

I claim:

1. An insulation displacement connection device for a coaxial cable with an inner cable conductor, an inner insulation surrounding the inner cable conductor, an outer conductor coaxially surrounding the inner cable conductor and the inner insulation, and an outer insulating cable sheath coaxially surrounding the outer conductor, comprising:

a conductive housing having a longitudinal axis and being formed with a cable connection stub adapted to receive a coaxial cable along a connection stub axis extending substantially transversely to the longitudinal axis;

an insulation displacement connection contact disposed inside said housing for electrically contacting an inner conductor of the coaxial cable inside said housing, and an insulation member insulating the inner conductor and the insulation displacement connection contact from said housing; and a clamping plug formed with cutting zones and adapted to be inserted into at least one opening formed in said cable connection stub crosswise to the connection stub axis for cutting through an outer insulating cable sheath of the coaxial cable crosswise to the coaxial cable and electrically contacting an outer conductor of the coaxial cable with said housing, said at least one opening starting at an outer surface of said conductive housing and extending towards and crosswise to the connection stub axis.

2. The device according to claim 1, wherein said clamping plug is formed to self-clampingly remain in said at least one opening and to retain the coaxial cable in said housing against being pulled out of said cable connection stub.

3. An insulation displacement connection device for a coaxial cable with an outer insulating cable sheath and an inner cable conductor, comprising:

a conductive housing having at least one end, an outer surface and an inner conductor insulation displacement connection contact for connecting to an inner conductor of the coaxial cable, said at least one end being a cable connection stub; and a clamping plug for insulation displacement connection of an outer cable conductor of a coaxial cable, said clamping plug having cutting zones for cutting through the outer insulating cable sheath of the coaxial cable in a given direction, said cable connection stub of said conductive housing having a center axis and at least one opening formed therein starting at said outer surface of said conductive housing and extending towards and crosswise to said center axis, said at least one opening being formed to receive said clamping plug in said given direction before cutting the coaxial cable, said cutting zones being formed to cut through the outer insulating cable sheath and to contact the outer cable conductor as said clamping plug is being plugged into said at least one opening, and said clamping plug being formed to be self-clampingly retained in said at least one opening in a plugged-in state in said at least one opening.

4. The insulation displacement connection device according to claim 3, wherein said at least one opening formed in said cable connection stub is one of two bores formed therein, said clamping plug for insulation displacement connection of the outer cable conductor being one of at least two clamping plugs having a knurled outer periphery and being conductive, said clamping plugs being self-clampingly pressed from opposite sides radially into said bores and having said cutting zones formed on a side facing toward the coaxial cable in said cable connection stub.

5. The insulation displacement connection device according to claim 4, wherein said cable connection stub has an inside diameter being approximately equal to an outside diameter of the coaxial cable including the outer insulation cable sheath.

6. The insulation displacement connection device according to claim 3, wherein said cable connection stub has a periphery, and said at least one opening in said cable connection stub, for introducing said device for insulation displacement connection of the outer cable conductor, is one of a plurality of bores formed at approximately opposed locations on said periphery of said cable connection stub.

7. The insulation displacement connection device according to claim 3, wherein said clamping plug has a side to be turned toward the coaxial cable in said cable connection stub upon insertion into said at least one opening, said side having a recess formed therein for partially receiving the coaxial cable.

8. The insulation displacement connection device according to claim 7, wherein said cable connection stub has a wall, and said at least one opening in said cable connection stub is a bore passing through said wall.

9. The insulation displacement connection device according to claim 8, wherein said bore and said clamping plug have substantially matching cross sections.

10. The insulation displacement connection device according to claim 8, wherein said bore and said clamping plug have substantially matching non-circular cross sections.

11. The insulation displacement connection device according to claim 8, wherein said clamping plug has a lateral outer surface and a knurled portion along said lateral outer surface.

12. The insulation displacement connection device according to claim 11, wherein said bore has given dimensions, said clamping plug has an unknurled region, said clamping plug has dimensions in said knurled region greater than said given dimensions of said bore, and said given dimensions of said bore are greater than said dimensions of said clamping plug in said unknurled region.

13. The insulation displacement connection device according to claim 8, wherein said cable connection stub has a periphery, said clamping plug is one of two clamping plugs, and said bores in said cable connection stub for introducing said clamping plugs are disposed at opposed points on said periphery.

14. The insulation displacement connection device according to claim 7, wherein said side of said clamping plug to be turned toward the coaxial cable in said cable connection stub has at least one cutting zone for cutting through the outer insulating cable sheath and for contacting the outer cable conductor.

15. The insulation displacement connection device according to claim 14, wherein said side of said clamping plug to be turned toward the coaxial cable in the cable connection stub has a periphery, and said at least one cutting zone is one of a plurality of cutting zones each formed by at least one protuberance converging to a point and each extending along the periphery of said side of said clamping plug to be turned toward the coaxial cable in the cable connection stub.

16. The insulation displacement connection device according to claim 7, wherein said at least one recess in said clamping plug has a substantially U-shaped cross section.

17. The insulation displacement connection device according to claim 7, wherein said at least one recess in said clamping plug for receiving the coaxial cable has a width less than an outside diameter of the inner insulation between the outer cable conductor and the inner cable conductor of the coaxial cable.

18. The insulation displacement connection device according to claim 7, wherein said at least one recess for receiving the coaxial cable is groove-like and extends transversely over all of said side of said clamping plug toward the coaxial cable.

19. The insulation displacement connection device according to claim 7, wherein said cable connection stub has an inside diameter approximately equal to an outside diameter of the coaxial cable including the outer insulating cable sheath.

20. An insulation displacement connection device, comprising:
a first electrical conductor and a second electrical conductor to be electrically connected to said first electrical connector;
said first electrical conductor having a defined longitudinal axis and being formed with an opening dimensioned for permitting said second electrical conductor to be introduced into said opening substantially without resistance along an insertion direction transverse to said longitudinal axis;
said first electrical conductor having a slit formed therein dimensioned with a width less than a diameter of said second electrical conductor, said slit beginning at said opening, extending transversely to the insertion direction, and penetrating through an outer surface of said first electrical conductor; and
a clamping plug adapted to be inserted into said slit and to cut into a cable sheath surrounding the second electrical conductor and for electrically contacting an outer cable conductor surrounding said second electrical conductor.

21. The insulation displacement connection device according to claim 20, wherein said opening in the first conductor is dimensioned for permitting the second conductor to be inserted into said opening substantially without resistance even in an at least partially insulated state.

22. The insulation displacement connection device according to claim 21, wherein said slit is constructed for cutting open any insulation present on the second conductor down to the second conductor, when the second conductor is pressed into said slit.

23. The insulation displacement connection device according to claim 20, including a pressure piece with at least one flat or curved pressing surface for pressing the second conductor into said slit, said at least one surface being constructed, disposed and dimensioned for pressing the second conductor into said slit without tilting or bending the second conductor.

24. The insulation displacement connection device according to claim 23, wherein the first conductor is constructed as an inwardly hollow first conductor, in the vicinity of said opening and said slit.

25. The insulation displacement connection device according to claim 24, wherein said recess and said slit extend through opposed wall portions of the hollow first conductor.

26. The insulation displacement connection device according to claim 25, wherein the first conductor has at least one other opening and at least one other slit formed therein, said recesses and said slits are opposite one another, said pressure piece has three pressing surfaces including one pressing surface for pressing a portion of the second conductor extending inside the inwardly hollow first conductor, and two pressing surfaces each for pressing against portions of the second conductor extending outside the hollow first conductor, adjacent said recesses and said slits.

27. The insulation displacement connection device according to claim 20, wherein the first and second electrical conductors are joined in a right-angle plug.

28. The insulation displacement connection device according to claim 27, wherein the second conductor is an inner conductor of a coaxial cable.

29. The insulation displacement connection device according to claim 27, including a plug screw for introducing said pressure piece into and retaining said pressure piece in said right-angle plug.

30. The insulation displacement connection device according to claim 20, wherein said opening merges continuously into said slit.

* * * * *